(12) United States Patent
Chencinski et al.

(10) Patent No.: US 12,248,636 B2
(45) Date of Patent: Mar. 11, 2025

(54) GESTURE RECOGNITION, ADAPTATION, AND MANAGEMENT IN A HEAD-WEARABLE AUDIO DEVICE

(71) Applicant: Microsoft Technology Licensing, LLC, Redmond, WA (US)

(72) Inventors: Eran Chencinski, Giv'at Shmuel (IL); Shoham Dekel, Nes Ziona (IL); Shmuel Kaufman-Fridman, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 121 days.

(21) Appl. No.: 17/752,120

(22) Filed: May 24, 2022

(65) Prior Publication Data

US 2023/0384866 A1   Nov. 30, 2023

(51) Int. Cl.
*G06F 3/01* (2006.01)
*G06F 3/0346* (2013.01)
(Continued)

(52) U.S. Cl.
CPC ............ *G06F 3/017* (2013.01); *G06F 3/012* (2013.01); *G06F 3/016* (2013.01); *G06F 3/0346* (2013.01);
(Continued)

(58) Field of Classification Search
CPC .......... G06F 3/017; G06F 3/012; G06F 3/016; G06F 3/0346; G06F 3/044; G06F 3/165; H04R 1/1041
(Continued)

(56) References Cited

U.S. PATENT DOCUMENTS 10,397,686 B2  8/2019  Förstner et al.
10,409,394 B2  9/2019  Förstner et al.
(Continued)

FOREIGN PATENT DOCUMENTS

WO   2020019355 A1   1/2020

OTHER PUBLICATIONS

Micusik et al. ("Ego-Motion Alignment from Face Detections for Collaborative Augmented Reality", ArXiv., Cornell University, Oct. 5, 2020) (Year: 2020).*

(Continued)

*Primary Examiner* — Paul Kim
(74) *Attorney, Agent, or Firm* — Weaver IP L.L.C.

(57) ABSTRACT

A head-wearable audio device has a motion sensor that outputs motion parameter values based on a detected motion gesture. A gesture type is recognized by comparing the motion parameter values and per-user per-gesture-type recognition parameter values. An action is selected based on the selected gesture type and is executed by the head-wearable audio device or an application in a remote computing device. The head-wearable audio device may also include a capacitive touch sensor that detects capacitive touch events and outputs capacitive touch parameter values. A gesture type may be recognized by comparing both of detected motion parameter values and detected capacitive touch parameter values with per-user per-gesture-type recognition parameter values. The per-user per-gesture-type recognition parameter values are improved over time using machine learning and/or automated logic based on historical detected motion or capacitive touch parameters and corresponding selected gestures, or user profile data.

20 Claims, 7 Drawing Sheets

(51) Int. Cl.
*G06F 3/044* (2006.01)
*G06F 3/16* (2006.01)
*H04R 1/10* (2006.01)

(52) U.S. Cl.
CPC .............. *G06F 3/044* (2013.01); *G06F 3/165* (2013.01); *H04R 1/1041* (2013.01)

(58) Field of Classification Search
USPC .......................................................... 381/74
See application file for complete search history.

(56) References Cited

U.S. PATENT DOCUMENTS

| | | |
|---|---|---|
| 10,771,881 B2 | 9/2020 | Turner et al. |
| 2015/0036835 A1 | 2/2015 | Chen |
| 2017/0308182 A1* | 10/2017 | Belverato ............. G06F 3/0346 |
| 2018/0277123 A1 | 9/2018 | Boesen et al. |
| 2019/0082307 A1 | 3/2019 | Miller et al. |
| 2020/0103961 A1 | 4/2020 | Wang et al. |
| 2021/0027199 A1 | 1/2021 | Avery et al. |
| 2021/0373847 A1 | 12/2021 | Buckley et al. |

OTHER PUBLICATIONS

"International Search Report and Written Opinion Issued in PCT Application No. PCT/US23/012973", Mailed Date: Jun. 22, 2023, 13 Pages.

Shi, et al., "Ready, Steady, Touch !: Sensing Physical Contact with a Finger-Mounted IMU", In Proceedings of the ACM on Interactive Mobile Wearable and Ubiquitous Technologies, Jun. 15, 2020, 25 Pages.

* cited by examiner

GESTURE RECOGNITION, ADAPTATION, AND MANAGEMENT IN A HEAD-WEARABLE AUDIO DEVICE

BACKGROUND

Since the advent of smart phones and various portable devices used for computing and playing audio or video content, head-wearable audio devices have become ubiquitously present throughout daily life. These head-wearable audio devices may include, for example, headphones, headsets, helmets, earphones, ear buds, etc. that may be equipped to communicate via wireless or wireline transmissions with a host device. Moreover, some head-wearable audio devices have built-in playback or radio audio sources.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for a head-wearable audio device that is configured to recognize different types of gesture input utilizing per-user per-gesture-type recognition parameter values to more accurately identify the gestures.

In one implementation, a head-wearable audio device comprises a motion sensor that is configured to detect a motion event and output one or more motion parameter values associated with the detected motion event. The head-wearable audio device also comprises a processor and a memory device. The memory device stores program code to be executed by the processor. The program code comprises a gesture-type recognizer that is configured to select a gesture type from among a plurality of gesture types based on at least a comparison of the one or more motion parameter values with one or more per-user per-gesture-type recognition parameter values. The head-wearable audio device also comprises an action determiner that is configured to select an action from among a plurality actions based on at least the selected gesture type. An action controller is configured to cause the selected action to be executed by at least one of the head-wearable audio device or a device that is communicatively coupled to the head-wearable audio device.

The head-wearable audio device may further comprise a capacitive touch sensor that is configured to detect a capacitive touch event and output one or more capacitive touch parameter values that are associated with the detected capacitive touch event. The gesture-type recognizer is further configured to select the gesture type from among a plurality of gesture types based on said comparison of the one or more motion parameter values with the one or more per-user per-gesture-type recognition parameter values and a comparison of the one or more capacitive touch parameter values with one or more other per-user per-gesture-type recognition parameter values.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
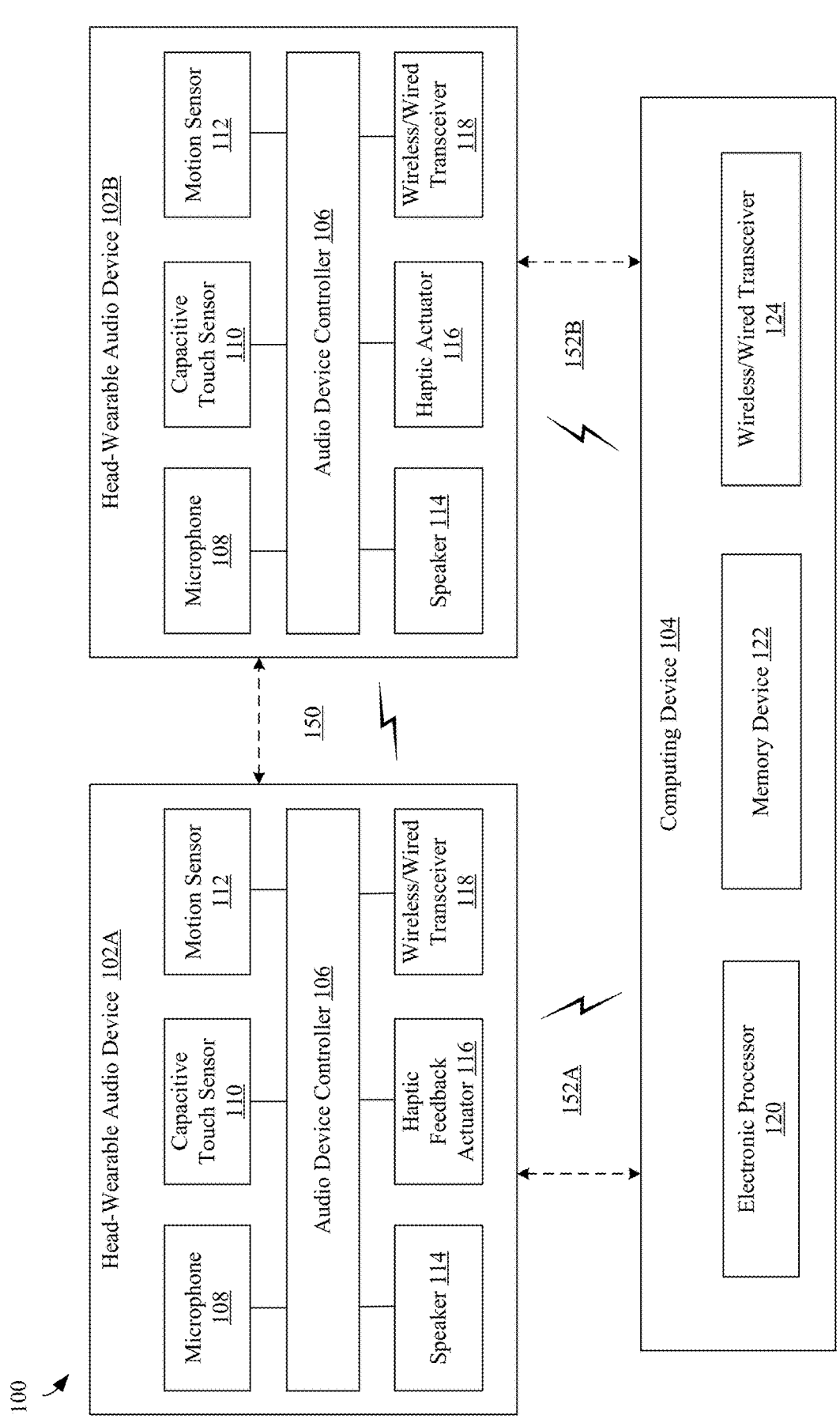
FIG. 1 is block diagram of a system including an example head-wearable audio device comprising motion and/or capacitive touch sensors for implementing device control utilizing gesture recognition, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on." If the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, head-wearable audio devices may include, for example, headphones, headset, earphones, ear buds, ear piece, helmet, etc. These devices may be equipped to communicate via wireless and/or wireline transmissions with a local or remote device. For example, the local or remote device (e.g., host device) may run a software application (e.g., a music player, video player, radio, video and/or audio conferencing application, etc.) and an operating system that controls transmission of audio signals to one or more head-wearable audio device(s) for outputting sound by a speaker of the head-wearable audio device(s). Contemporary earbuds and headphones may offer limited device control options for receiving input by a user. Some example controls may include capacitive touch sensors for detecting tap gestures to a head-wearable audio device. A capacitive touch gesture may be associated with a specific action. However, the number and types of gestures available in head-wearable audio devices may be limited to capacitive taps and swipes. Other example controls include pressure sensors and mechanical buttons. However, these types of controls have disadvantages when compared to capacitive touch sensors. For example, they are less sensitive and need more force applied in order for a tap to be detected. Also, they do not support gestures such as swipes, and therefore allow a more limited number of gesture types.

Earbuds and headphones may be equipped with capacitive touch detectors such that users may be limited to providing capacitive touch gesture input using exposed skin, such as a fingertip, to contact a touch pad. This makes it difficult to perform a gesture when wearing gloves or when hands are busy. Moreover, people with certain disabilities may have problems triggering capacitive touch gestures, especially when the gestures are difficult to perform (e.g., swipes). Also, a valid double tap gesture may be too quick for some individuals to successfully perform.

In gesture recognition systems, a gesture type may associated with a predefined parameter value that may include a threshold. The predefined parameter value may be utilized in a gesture recognition process. Unfortunately, users may not know if an input gesture has been received, and some users may repeatedly have difficulty in successfully performing gestures.

Methods, systems, and computer program products disclosed herein enable features such as new gesture categories for head-wearable audio device(s), new actions resulting from gesture input, and new ways for a user to perform the gestures. For example, the head-wearable audio device(s) may be equipped with motion sensors (e.g., inertial measurement units (IMU)) and/or capacitive touch sensors that may be utilized for enabling these features. In some embodiments, touch gesture inputs (e.g., taps, swipes, pinches, etc.) may be detected using the motion sensors. For example, touch input may be detected by the motion sensor when a user is wearing gloves or making contact using a non-electrically-conductive material (e.g., using a material other than skin contact, such as using a covered wrist or shoulder to input a tap or a swipe gesture). Each gesture type may be associated with a corresponding sensor output signature, and each user's sensor output signature for a particular type of gesture may have some unique spatial and/or temporal characteristics or ranges in measurements (e.g., velocity, force, distance traversed, duration, direction, spatial orientation, angle, etc.) as compared to other user's sensor output signatures. For example, a motion sensor output signature for a tap may comprise a short and significant spike in acceleration of the device in one direction and a bounce backwards, but the level and/or direction of acceleration may be different for different users. Gesture recognition may be based on motion sensor output alone (e.g., when a touch is not detected by a capacitive touch sensor), or motion sensor output in combination with capacitive touch sensor output, to increase a confidence level of gesture recognition.

In some embodiments, one or more motion sensors in the head-wearable audio device may be configured to detect movement and output motion parameter values. The motion parameters may be utilized in the recognition of an input gesture for initiating a corresponding action in the head-wearable audio device or by an application or operating system in a host device (e.g., speaker volume up, volume down, mute microphone, etc.). For example, gesture types comprising turning the head to the right by more than 30 degrees or to the left by more than 30 degrees may indicate that a user would like a media player application to move forward or backwards in a playlist. Gesture types including tilting the head worn device (e.g., chin up) by 30° and (chin down) by 30° may indicate that a user in a video conference meeting is virtually "raising" or "lowering" their hand. In another example, a virtual-mouse-movement cursor displayed on a computer screen may be moved in various directions across the screen based on a user's head movements in accordance with specified gesture types. Also, quick head movement gestures may be recognized for performing a right virtual mouse click or a left virtual mouse click.

In some embodiments, a head gestures mode, where head motion gestures are enabled for controlling corresponding actions, may be triggered under certain conditions or for use with specified applications. For example, an application running in a host device may communicate with the head-wearable audio device to request reporting of head motion gestures. In another example, a user can manually enable or disable the use head motion gestures (e.g., by inputting swipes, taps, etc.). Moreover, head motion gestures may be enabled or disabled in response to a user's voice command or a large head movement angle by the user.

Methods, systems, and computer program products disclosed herein provide for gesture confirmation indicators to be generated to a user of the head-wearable audio device for indicating a successful detection of a gesture. In one example, immediate gesture confirmation may be indicated to the user by the head-wearable audio device without having to wait for processing time of an application or operating system in a host device. The confirmation indicator may be audio feedback such as a short sound delivered via one or more speakers of a pair of earbuds or headphones, or haptic vibrations delivered via a haptic actuator in the earbuds or headphones. In some embodiments, a user may be able to enable or disable the gesture confirmation indicator, or customize the type of indicator (e.g., a short tone, haptic vibration pattern, etc.) on a per gesture type basis.

Methods, systems, and computer program products disclosed herein may include applying learning algorithms (e.g., machine learning or rule based logic) to gesture identification processes in order to learn gesture patterns or gesture characteristics specific to each user (e.g., a user's gesture signature comprising sensor output parameter values triggered by the user's input). The learning algorithms allow for customized gesture recognition for the user. These gesture patterns or characteristics may be persistently stored in memory of the head-wearable audio device, or in a user profile stored in a host device or in the cloud. One or more machine learning model(s) may be created that is tailored for each user. Moreover, gesture characteristics (e.g., velocity, acceleration, force, distance, direction, duration) may be determined for each user for use in gesture recognition processes. For example, gesture recognition threshold values may be adjusted or determined based on detected gesture parameter values of a user (e.g., minimums, maximums, average values, etc.) that are output from a sensor. For example, gesture characteristics may be based on trajectories of one or more head gestures (e.g., relative movements of a user's head), or velocity of a head movement (e.g., the speed and/or direction of each gesture movement).

Methods and systems disclosed herein provide various user-configurable settings. For example, a user can adjust delay time between taps for detecting a double tap, a user can enable or disable certain gesture types, a user may configure which action to perform in response to which gesture type (e.g., for all gestures), a user can enable or disable gesture confirmation indicators to the user in response to a gesture input, and configure which kind of indictors (e.g., haptic feedback) to provide to the user on a per gesture basis.

As described above, head-wearable audio devices may be configured in various ways to receive and recognize a user's input gestures and cause actions to be executed in response to those gestures. For instance, FIG. 1 is block diagram of a system 100 including an example head-wearable audio device comprising motion and/or capacitive touch sensors for implementing device control utilizing gesture recognition, according to an example embodiment. As shown in FIG. 1, system 100 includes a head-wearable audio device 102A, a head-wearable audio device 102B, a computing device 104, a communication channel 150, a communication channel 152A, and a communication channel 152B. Head-wearable audio device 102A includes an audio device controller 106, a microphone 108, a capacitive touch sensor 110, a motion sensor 112, a speaker 114, a haptic feedback actuator 116, and a wireless and/or wired transceiver 118. Head-wearable audio device 102B may also include an audio device controller 106, a microphone 108, a capacitive touch sensor 110, a motion sensor 112, a speaker 114, a haptic feedback actuator 116, and a wireless and/or wireless transceiver 118. Computing device 104 includes an electronic processor 120, a memory device 122, and a wireless and/or wired transceiver 124.

Both of head-wearable audio device 102A and head-wearable audio device 102B may be referred to as head-wearable audio devices 102. Either one of head-wearable audio devices 102A or 102B may be referred to as head-wearable audio device 102A or 102B. One of the head-wearable audio devices or both of the head-wearable audio devices may be referred to as one or both of head-wearable audio devices 102.

System 100 may comprise head-wearable audio devices 102A and 102B, or may comprise only one of the head-wearable audio devices (e.g., head-wearable audio device 102A). Moreover, although head-wearable audio devices 102A and 102B are shown as having all the same components, in some embodiments they may be different. For example, head-wearable audio device 102B may include only a portion of the components that are included in head-wearable audio device 102A, and may perform only a portion of the functions supported in head-wearable audio device 102A. Moreover, both of head-wearable audio devices 102A and 102B may comprise only a portion of the components shown in FIG. 1. Some of the functions that may be executed in audio device controller 106 may also, or in the alternative, be executed by electronic processor 120 in computing device 104.

In general, head-wearable audio devices come in many different forms. Head-wearable audio device(s) 102A and/or 102B may comprise any suitable type of head-wearable audio device, for example, ear buds, headphones, a headset, a helmet, earpieces, earphones, etc. The head-wearable audio device(s) may comprise a speaker that fits into the ear canal, close to but outside of the ear canal, over the ear, around the ear, or near the ear. Head-wearable audio device 102A and 102B may each be integrated in a separate or individual housing, for example, as in earbuds, earphones, or earpieces. Alternatively, or in addition, head-wearable audio device(s) 102A and 102B may both be integrated within a single housing or attached within a single wearable device such as a headset or a pair of earphones coupled to a headband, behind the neck band, helmet, etc. Moreover, system 100 may include only one head-wearable audio device (e.g., 102A) such as single earbud, single earpiece, or single earphone.

Head-wearable audio device(s) 102A and/or 102B may comprise or be integrated within a housing (not shown) that may also include or be attached to features not shown in FIG. 1. For example, mechanical controls or compartments may be disposed on, attached to, or connected to (e.g., via wire) the housing of one or both of head-wearable audio devices, such as one or more buttons, slide controls, knobs, memory card slots (e.g., for a TransFlash or secure digital card), battery compartments, antennas, etc. The mechanical controls may be utilized to control or adjust various functions such as a power on/off function, volume up or down speaker control, microphone mute, answer phone control, enable or disable a feature, etc. The mechanical features included with a pair of head-wearable audio devices, such as earbuds or headphones, may be the same or different for each device of the pair.

Figure 2:
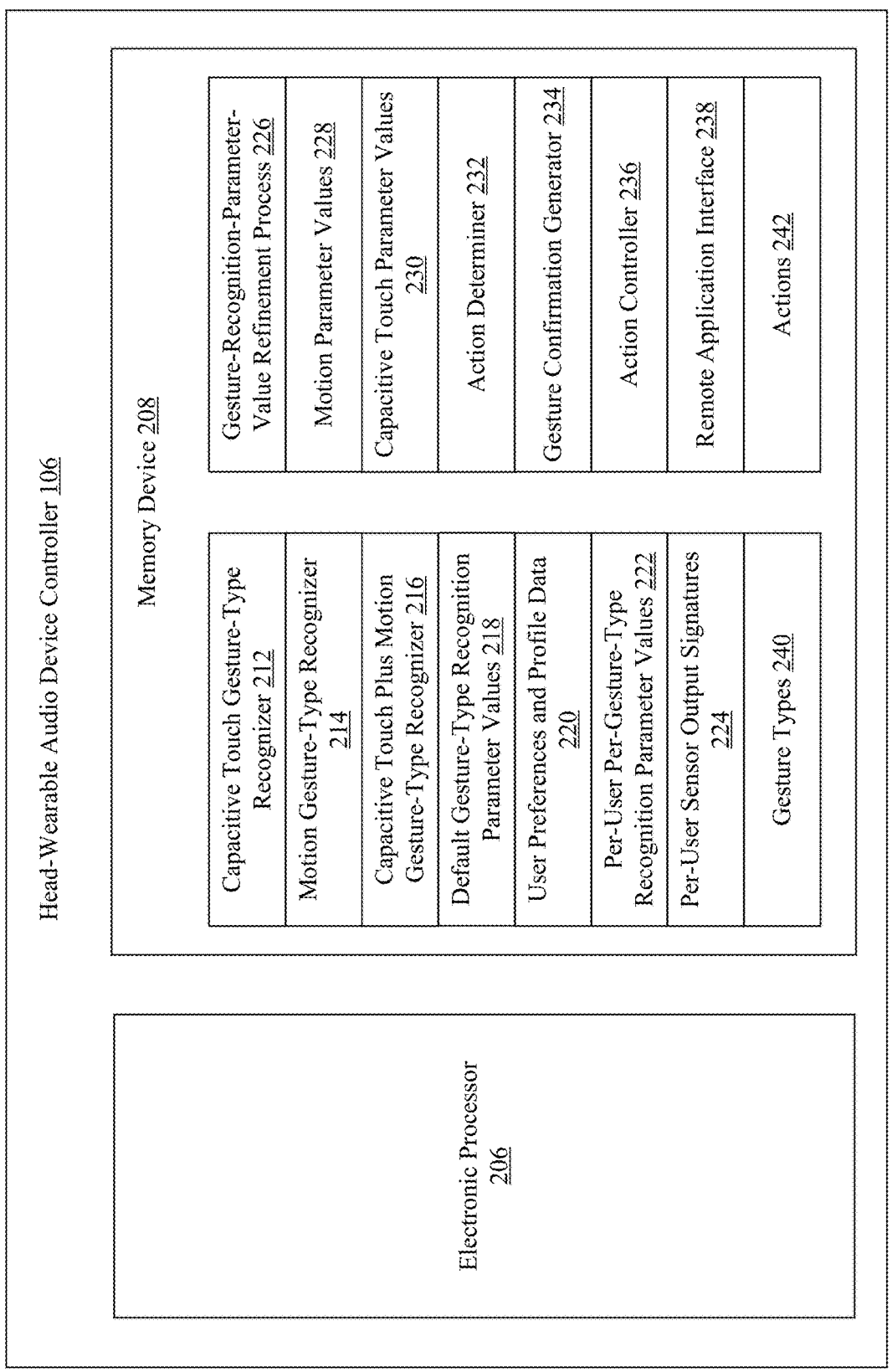
FIG. 2 is block diagram of a system comprising an example audio device controller and program code for implementing and refining gesture recognition functions of the head-wearable audio device shown in FIG. 1, according to an example embodiment.

Controller 106 may comprise an electronic processor and memory (as shown in FIG. 2). For example, controller 106 may comprise a microcontroller that includes a memory on a single integrated circuit (IC). In another example, audio device controller 106 may comprise a central processing unit (CPU) that is coupled to a memory device. Audio device controller 106 may be communicatively coupled to microphone 108, capacitive touch sensor 110, motion sensor 112, speaker 114, haptic feedback actuator 116, and/or wireless and/or wired transceiver 118. Audio device controller 106 may be configured to receive sensor input from motion sensor 112 and/or capacitive touch sensor 110, and may process, store, and/or communicate the sensor data, for example, for use in recognizing gestures input by a user via the sensor(s).

Wireless and/or wired transceiver 118 of head-wearable audio device 102A, wireless and/or wired transceiver 118 of head-wearable audio device 102B, and/or wireless and/or wired transceiver 124 of computing device 104 may each be configured for communication based on any suitable wireline technology (e.g., universal serial bus (USB), jack and plug interfaces) or wireless technology (e.g., infrared data association (IrDA), wireless USB, Bluetooth, Zigbee, ultra-wideband, etc.). In one example, two or more of these transceivers may be configured to communicate wirelessly based on Bluetooth technology via a type of personal area network or piconet. Alternatively, or in addition, these transceivers may communicate via a USB wired interface. However, the disclosure is not limited with regard to any specific type of communication technology, and any suitable technology, network, or ad hoc communication may be utilized for communication by the head-wearable audio device 102A and/or 102B.

In some embodiments, controller 106 of head-wearable audio device 102A may be communicatively coupled to controller 106 of head-wearable audio device 102B and/or one or more other components of head-wearable audio device 102B (e.g., microphone 108, capacitive touch sensor 110, motion sensor 112, speaker 114, or haptic feedback actuator 116) via wireless and/or wired transceiver 118 of head-wearable audio device 102A, communication channel 150, and wireless and/or wired transceiver 118 of computing device 104. In some embodiments, audio device controller 106 of head-wearable audio device 102A may be configured to transmit information and/or commands to audio device controller 106 or one or more of the other components of head-wearable audio device 102B.

In some embodiments, audio device controller 106 of head-wearable audio device 102A may be communicatively coupled with electronic processor 120 of computing device 104 via the wireless and/or wired transceiver 118 of head-wearable audio device 102A, communication channel 152A, and wireless and/or wired transceiver 124 of computing device 104. Similarly, audio device controller 106 of head-wearable audio device 102B may be communicatively coupled with electronic processor 120 of computing device 104 via the wireless and/or wired transceiver 118 of head-wearable audio device 102B, communication channel 152B, and wireless and/or wired transceiver 124 of computing device 104. In some embodiments, one or both of audio device controllers 106 of head-wearable audio devices 102A and 102B may be configured to transmit and/or receive information and/or commands to/from computing device 104 via communication channel 152A or 152B respectively.

One or both of head-wearable audio device 102A and 102B may be equipped with or communicatively coupled to one or more microphones such as microphone 108. For example, a microphone 108 may be integrated within or communicatively coupled to one or both of a pair of earbuds, one or both of a pair of headphones, a headset, earpiece, etc. Microphone 108 may be utilized to pick-up voice commands from a user or configuration information for audio device controller 106 or electronic processor 120 of computing device 104.

One or both of head-wearable audio devices 102A and 102B may be equipped with or communicatively coupled to a capacitive touch sensor 110. For example, capacitive touch sensor 110 may comprise any suitable a touch surface or pad and circuitry that can detect contact based on capacitive coupling with an electrically conductive object (e.g., a user's fingertip). The detected contact with capacitive touch sensor 110 may be referred to as a capacitive touch event and may comprise, for example, one or more of a touch or tap gesture, a swipe gesture (e.g., swipe up, swipe down, etc.), a pinch gesture (e.g., pinch in, pinch out), etc. on or over the capacitive touch surface. Capacitive touch sensor 110 may output capacitive touch parameter values to audio device controller 106 that define characteristics of a touch gesture input by a user (e.g., velocity, direction, duration, repetition, etc.).

One or both of head-wearable audio devices 102A and 102B may be equipped with or communicatively coupled to a motion sensor 112. For example, each motion sensor 112 may comprise any suitable motion sensor and circuitry that can detect one or more characteristics (i.e., parameters) of motion (e.g., distance, velocity, direction, acceleration, force, rotational angle, angular direction (e.g., roll, pitch, yaw), or angular rate of motion) of head-wearable audio device(s) 102A and/or 102B. Motion sensor(s) 112 may output motion parameter values that represent the detected motion characteristics. For example, motion sensor 112 may comprise an inertial measurement unit (IMU). Motion sensor 112 may be configured to detect various types of gestures that may be input by a user such as a head turn in one or more directions, at one or more angles, or at one or more rates, a tap, multiple taps at one or more rates, or a hold to the motion sensor by an object (e.g. a tap by a user's finger, wrist, or shoulder). In this regard, motion sensor(s) 112 may be configured to detect touches to head-wearable audio device 102A and/or 102B by detecting motion of the head-wearable audio device due to a touch, as well as due to head movements made by a user. Moreover, some of the touches detected by the motion sensor may not be detectable by the capacitive touch sensor because they do not impart a detectable electrically conductive interaction with the capacitive touch sensor due to non-conductive characteristics of the material contacting the capacitive touch sensor. Motion sensor 112 may output motion parameter values based on motion characteristics of touch or motion gestures input by a user to audio device controller 106.

Speaker(s) 114 in head-wearable audio devices 112A and/or 112B may be configured to output sound based on audio signals originating from an application or operating system of computing device 104 and/or generated by an audio device controller 106 within a respective head-wearable audio device 102A or 102B. Furthermore, audio signals generated in one of the head-wearable audio devices 102 may be communicated to the other head-wearable audio device 102 via communication channel 150 for output of sound via speaker 114 at the other head-wearable audio device. In one example, the sound may comprise a tone indicating confirmation of a user's gesture input.

One or both of head-wearable audio devices 102A and 102B may be equipped with a haptic feedback actuator 116. Haptic feedback actuator(s) 116 may be configured to receive a command from an audio device controller 106, and in response, generate a tactile stimulus to the user (i.e., haptic feedback), such as a vibration, via the respective head-wearable audio device 102. In some embodiments, the haptic feedback may have a specified intensity or frequency that may indicate a type of feedback. For example, a low frequency vibration may indicate confirmation of receipt of a gesture, or a high frequency vibration may indicate that the gesture was not understood and should be repeated.

Computing device 104 may include electronic processor 120, memory device 122, and wireless and/or wired transceiver 124. Computing device 104 may be configured to run one or more applications that may interact with head-wearable audio device(s) 102A and/or 102B (e.g., a media player, a video conferencing application, phone functions, etc.). Computing device 104 may comprise any type of computing device and/or communication device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation), or a desktop computer or PC (personal computer).

Electronic processor 120 may include any number of processors, including central processing units (CPUs), microprocessors, multi-processors, processing cores, and/or any other suitable hardware-based processor types described herein or otherwise known.

Memory device 122 may include one or more of any suitable type of physical storage mechanism, including a magnetic disc (e.g., in a hard disk drive), an optical disc (e.g., in an optical disk drive), a solid-state drive (SSD), a memory device such as a RAM (random access memory) device, a ROM (read only memory) device, etc., and/or any other suitable type of physical, hardware-based storage medium.

As described above, one or both of audio device controller(s) 106 may be configured to recognize different types of gestures input by a user. For instance, FIG. 2 is block diagram of a system 200 comprising an example audio device controller and program code for implementing and refining gesture recognition functions of a head-wearable audio device shown in FIG. 1, according to an example embodiment. As shown in FIG. 2, system 200 includes head-wearable audio device controller 106 that includes an electronic processor 206 and a memory device 208. Memory device 208 comprises capacitive touch gesture-type recognizer 212, motion gesture-type recognizer 214, capacitive touch plus motion gesture-type recognizer 216, default gesture-type recognition parameter values 218, user preferences and profile data 220, per-user per-gesture-type recognition parameter values 222, per-user sensor output signatures 224, gesture-recognition-parameter-value refinement process 226, motion parameter values 228, capacitive touch parameter values 230, action determiner 232, gesture confirmation generator 234, action controller 236, remote application interface 238, gesture types 240, and actions 242. One or both of head-wearable audio device(s) 102A and 102B may each include all of the program code shown in memory device 208, or one or both of head-wearable audio device(s) 102A and 102B may each include only a subset of the program code shown in memory device 202.

User preferences and profile data 220 may comprise information configured by a user or information about the user collected by head-wearable audio device controller 106 or an application in computing device 104. For example, user preferences and profile data 220 may include user-configurable settings for characteristics of gestures (e.g., time delay between taps for detecting a double tap, which gesture types to enable or disable, which action to perform in response to which gesture type, enabling or disabling gesture confirmation indicators to the user in response to a gesture input, which kind of gesture confirmation indicators (e.g., haptic feedback, sound, etc.) to provide to the user on a per gesture basis. In some embodiments, a user may configure settings for the preferences and profile data 220 using an application user interface displayed by a display screen of computing device 104. Alternatively or in addition, one or more applications of applications 332 may gather or receive information about a user to be stored in user preferences and profile data 220 and/or 336. The settings may be communicated from computing device 104 to one or both of head-wearable audio device(s) 102A and 102B. Moreover, audio device controller 106 may be configured to generate and/or store information in user preferences and profile data 220. For example, if head-wearable audio device 102A is configured to generate a haptic feedback confirmation in response to a gesture input (e.g., a touch or movement gesture), and the user taps head-wearable audio device 102A to stop the haptic feedback after multiple feedback instances, audio device controller 106 may disable the haptic feedback in user preferences and profile data 220. User preferences and profile data 220 may also include user demographic information, such as a user's age. Data stored in user preferences and profile data 220 may be utilized to generate per-user per-gesture-type recognition parameter values or to adjust these parameter values. In general, settings available for configuration by a user may include: selections for which gesture types of gesture types 240 to enable or disable, adjusting characteristics of each gesture type of gesture types 240 (e.g., adjusting default gesture-type recognition parameter values 218, or per-user per-gesture-type recognition parameter values 222) for gesture recognition of motion, capacitive touch, or sound user gesture input. Configurable settings may also include mapping or associating a gesture type of gesture types 240 to an action of actions 242, selecting which types of gesture confirmation indicators (e.g., haptic feedback, sound feedback, etc.) to enable or disable in gesture confirmation generator 234, or mapping or associating a gesture confirmation indictor type (e.g., haptic feedback, sound feedback, etc.) to a gesture input type (e.g., forward head tilt, double tap, capacitive touch swipe, etc.) for use in gesture confirmation generator 234.

Motion parameter values 228 may comprise parameter values that were output from motion sensor 112 in one or both of head-wearable audio device(s) 102A and 102B as a result of detection of a user's gesture input. For example, motion parameter values 228 may comprise values representing a measured distance, velocity, direction, duration, acceleration, force, rotational angle, angular direction (e.g., roll, pitch, yaw), or angular rate of motion of the gesture, as measured or determined by motion sensor(s) 112. As described above, the motion parameter values may be generated as a result of a head motion or a type of touch to the head-wearable audio device, even though the touch may or may not be detectable by capacitive touch sensor 110. Utilizing motion parameter values in touch gesture recognition enables recognition when the capacitive touch sensor fails to detect a touch input. Also, utilizing both of motion parameter values and capacitive touch parameter values allows for improved recognition accuracy and confidence to be realized. Motion parameter values 228 may be utilized in motion gesture-type recognizer 214, capacitive touch plus motion gesture-type recognizer 216, per-user sensor output signatures 224, and/or gesture-recognition-parameter-value refinement process 226.

One or both of audio device controller(s) 106 may store motion parameter values in their respective memory device 208 and/or may transmit the motion parameter values to computing device 104 for storage in sensor data and statistics 338 and/or for use by machine learning gesture-recognition-parameter-value refinement process 340.

Capacitive touch parameter values 230 may comprise parameter values that were output from a capacitive touch sensor 110 in one or both of head-wearable audio device(s) 102A and 102B as a result of detection of a user's gesture input. For example, capacitive touch parameter values 230 may represent distance, velocity, direction, acceleration, or duration of a touch gesture as measured or determined by capacitive touch sensor 110. Capacitive touch parameter values 230 may be utilized in capacitive touch gesture-type recognizer 212, capacitive touch plus motion gesture-type recognizer 216, per-user sensor output signatures 224, and/or gesture-recognition-parameter-value refinement process 226.

One or both of audio device controllers 106 in head-wearable audio devices 102A and 102B may store capacitive touch parameter values in their respective memory device 208 and/or may transmit the touch parameter values to computing device 104 for storage in sensor data and statistics 338 and/or for use by gesture-recognition-parameter-value refinement process 340.

Gesture types 240 and actions 242 may also be stored in memory device 208. Gesture types 240 may comprise a plurality of default or user defined gesture types for motion and/or capacitive touch inputs. Some example gesture types include a tap, a double tap (e.g., taps within a specified time delay), swipe up (relative to a velocity or length threshold), swipe down, swipe left swipe right, pinch in, pinch out, turn head right or left (e.g., relative to a threshold for turn angle), tilt chin up or down (e.g., relative to a threshold in degrees), tap head to right or left shoulder, etc. In terms of parameter values output from motion sensor 112 or capacitive touch sensor 110, each type of gesture may be defined by various parameter values (e.g., minimum or maximum thresholds, range thresholds, duration thresholds, etc.) that may be stored as default gesture-type recognition parameter values 218 or per-user per-gesture-type recognition parameter values 222, which are described in more detail below. Each type of gesture of gesture types 240 may be associated with one or more action of action represented in actions 242, and vice versa. Actions 242 may comprise actions executed within one or both of head-wearable audio device(s) 102A and 102B in response to selection of an associated (i.e., corresponding) gesture type. Example actions of actions 242 may comprise power on, power off, speaker volume up, volume down, mute microphone, etc. Moreover, actions of actions 242 may comprise actions executed within or relative to computing device 104 including actions caused by operating system 330 or by an application of applications 332 in response to selection of an associated gesture type. For example, operating system 330 may be configured to increase or decrease sound volume in computing device 104 in response to a selected gesture type. In another example, an action controlled by a media player application running in computing device 104 may include moving forward or backwards in a playlist in response to a selected gesture type. An action controlled by a video conference application may include virtually "raising" or "lowering" a user's hand during a meeting in response to a selected gesture type. In another example, an action controlled by a text editing application or a browser application may cause a virtual-mouse-movement cursor displayed on a computer screen to be moved in various directions across the screen based on a selected gesture type. Moreover, a right virtual mouse click or a left virtual mouse click may be executed based on another selected gesture type.

A plurality of default gesture-type recognition parameter values 218 and/or per-user per-gesture-type recognition parameter values 222 may be stored in memory device 208. In general, gesture-type recognition parameter values may each comprise a set of parameter values that define a type of gesture. For example, gesture-type recognition parameter values may specify thresholds for limits on, or ranges of, allowed distance, velocity, direction, duration, acceleration, force, rotational angle, and/or angular direction associated with each type of gesture input, and that are used to recognize a gesture type. For example, gesture-type recognition parameter values for a double tap gesture may indicate a minimum acceleration threshold for a movement caused by a tap, and a range of allowable displacement directions, a maximum acceleration threshold for a bounce back motion, and also a specified time delay threshold for time between the first tap and the second tap. In another example, gesture-type recognition parameter values for a right head tilt gesture may indicate a roll of head-wearable audio device 102 greater than 30° in a specified range of relative directions (e.g., toward a right shoulder). Other gestures that may be detected or measured by motion sensor(s) 112 may include tilting the head in a chin-up or chin-down direction, turning the head to the right or left, and/or tilting the head toward a left shoulder or right shoulder greater than or less than an angular degree threshold value. However, the disclosure is not limited to any specific gesture-type recognition parameter values and any suitable parameter values may be utilized to define a gesture type in terms of motion.

Default gesture-type recognition parameter values 218 may comprise pre-determined values, whereas per-user pergesture-type recognition parameter values 222 may be generated or refined (e.g., updated) over time by gesture-recognition-parameter-value refinement process 226. For example, gesture-recognition-parameter-value refinement process 226 may be configured to generate or refine (e.g., update) per-user per-gesture-type recognition parameter values 222 utilizing one or more of the following: (1) information stored in user preferences and profile data 220, (2) machine learning models that are trained based on a plurality of historical detected gesture data (e.g., based on motion parameter values 228 and/or capacitive touch parameter values 230) and corresponding gesture selections, and (3) automated rule based logic directed to historical detected gesture data (e.g., based on motion parameter values 228 and/or capacitive touch parameter values 230) and corresponding gesture selections. In some embodiments, gesture-recognition-parameter-value refinement process 226 may be configured to refine default gesture-type recognition parameter values 218 to generate per-user per-gesture-type recognition parameter values 222 based on one or more of the same methods listed above with respect to per-user per-gesture-type recognition parameters.

Figure 3:
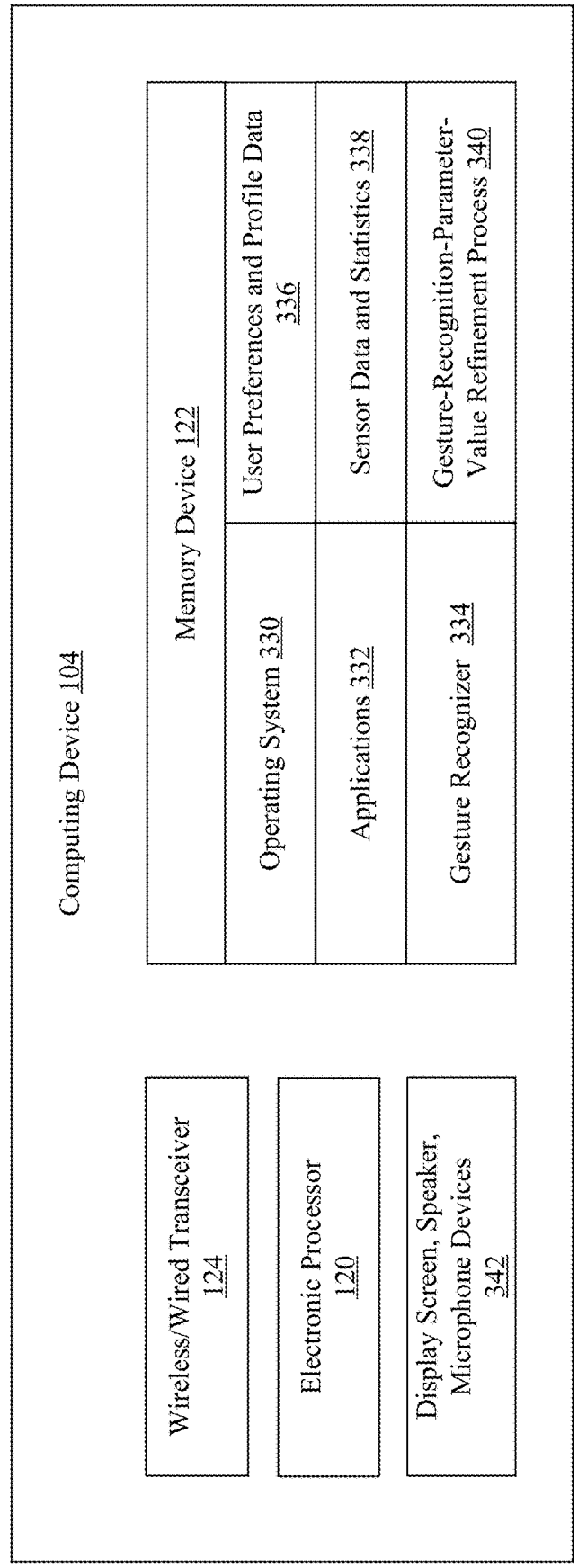
FIG. 3 is block diagram of a system comprising an example processor and program code of the computing device shown in FIG. 1, according to an example embodiment.

As described above, computing device 104 may be configured to assist in gesture recognition and/or recognition refinement functions related to head-wearable audio device(s) 102A and/or 102B. Moreover, applications running in computing device 104 may implement commands based on a user's gesture inputs to head-wearable audio device(s) 102A and/or 102B. For instance, FIG. 3 is block diagram of a system 300 comprising an example processor and program code for the computing device shown in FIG. 1, according to an example embodiment. As shown in FIG. 3, system 300 includes computing device 104, wireless or wired transceiver 124, electronic processor 120, memory device 122, and display screen, speaker, and microphone devices 342. Memory device 122 comprises an operating system 330, application(s) 332, a gesture recognizer 334, user preferences and profile data 336, sensor data and statistics 338, and a machine learning gesture-recognition-parameter-value refinement process 340. In some embodiments, memory device 122 may store additional program code such as program code described with respect to memory 208 of FIG. 2, or may include only a subset of the program code shown in memory device 122.

One or more of display screen, speaker, and microphone devices 342 may comprise peripheral devices relative to computing device 104 or devices integrated within computing device 104. The display screen may comprise any suitable type of display, which may be built into or physically separate from computing device 104, such as a cathode ray tube (CRT) display, a liquid crystal display (LCD) display, a light emitting diode (LED) display, a plasma display, or other display type. Note that the display screen of computing device 104 may be a single display screen or may be comprised of multiple separate display screens.

Operating system 130 may comprise any suitable type of operating system, including Microsoft Windows®, Apple Mac OS® X, Google Android™, and Linux®. Operating system 130 and/or one or more of applications 332 may be configured to control characteristics of sound output by the speaker(s) or input from the microphone. Moreover, operating system 130 may be configured to render images on the display screen.

Application(s) 332 may comprise any suitable one or more applications that may be executed by electronic processor 120. For example, application(s) 332 may comprise one or more applications that send audio signals to one or both of head-wearable audio devices 102. Moreover, one or more of application(s) 332 may be configured to generate a user interface that may be displayed in the display screen, generate audio that may be output by the speaker(s), and/or receive audio input from the microphone of display screen, speaker, and microphone devices 342. In some embodiments, a user may communicate with one or more of the application(s) 332 via microphone 108 and/or speaker 114 of one or both of head-wearable audio devices 102. Moreover, a user may interact or communicate with one or more of applications 332 utilizing motion and/or capacitive touch gestures detected by motion sensor 110 and/or capacitive touch sensor 112 of one or both of head-wearable audio devices 102. For example, a user may interact in a video conference application, a media player application, a phone application, a video game, etc. by inputting motion or capacitive touch gesture inputs to one or both of head-wearable audio devices 102.

Although various program code and data are shown in memory device 208 of FIG. 2, some or all of the program code and data may alternatively, or in addition, be stored in memory device 122 of computing device 104. In this regard, functions described herein as being performed by one or both of head-wearable audio device(s) 102 may be executed by electronic processor 120 of computing device 104. For example, program code for capacitive touch gesture-type recognition, motion gesture-type recognition, capacitive touch plus motion gesture-type recognition, gesture-recognition-parameter-value refinement process, gesture confirmation generation, and/or action control may be stored in memory device 122 for performing functions of the respective program code. Moreover, various data shown as being stored in memory device 208 may be stored in memory device 122. For example, memory device 122 may be configured to store per-user per-gesture-type recognition parameter values, per-user sensor output signatures, motion parameter values, capacitive touch parameter values, gesture types, and/or actions. In some embodiments, the data stored in memory device 208 of one or both of head-wearable audio device(s) 102A and 102B may be utilized during the execution of the program code stored in memory device 208 for performing functions of the respective program code. Alternatively, or in addition, data stored in memory device 208 of one or both of head-wearable audio device(s) 102A and 102B may be transmitted to computing device 104, such that program code stored in memory device 122 may be executed to perform functions of the respective program code (e.g., motion parameter values output from motion sensor 112 may be transmitted to computing device 104 and motion gesture-type recognition program code and/or action determiner program code stored in memory device 122 may be executed to select a gesture type and/or an action based on the transmitted motion parameter values). The selected gesture type and/or selected action may be transmitted back to one or both of head-wearable audio device(s) 102A and 102B. If just a selected gesture type is returned, action determiner 232 may be configured to determine an action based on the selected gesture type. If the selected action is returned, action controller 236 may cause the selected action to be executed.

In another example, user preferences and profile data 336 of computing device 104 may comprise the same or similar data as user preference and profile data 220 of one or both of head-wearable audio device(s) 102A and 102B. Alternatively, the data stored in head-wearable audio device(s) 102 may comprise a subset of the data stored in computing device 104, or vice versa. In some embodiments, user preferences and profile data may be stored only in memory device 122 of computing device 104.

Figure 4:
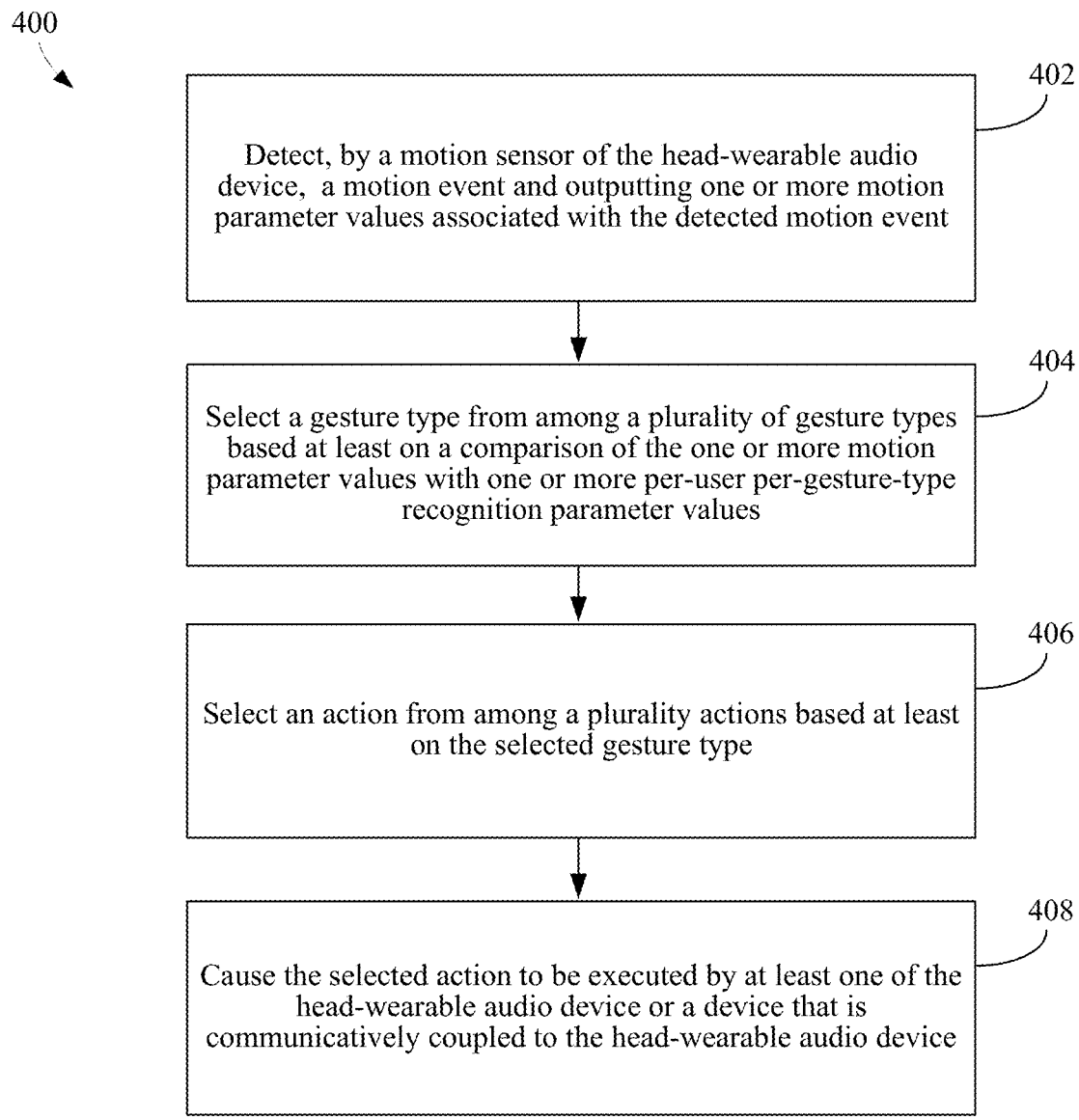
FIG. 4 is a flowchart of a method for recognizing a gesture type based on a motion event and causing a corresponding action to be executed, according to an example embodiment.

As described above, one or both of head-wearable audio device(s) 102A and 102B may comprise a motion sensor 112 that is configured to detect head movements and/or touch input based on motion of the head-wearable audio device. For instance, FIG. 4 is a flowchart 400 of a method for recognizing a gesture type based on a motion event and causing a corresponding action to be executed, according to an example embodiment. Flowchart 400 may be implemented in systems 100, 200, and 300. For purposes of illustration, flowchart 400 is described with reference to FIGS. 1, 2, and 3. Other structural and operational embodiments will be apparent to persons skilled in the relevant art(s) based on the following discussion regarding flowchart 400.

Flowchart 400 begins with step 402. In step 402, a motion sensor of the head-wearable audio device detects a motion event and outputs one or more motion parameter values associated with the detected motion event. For example, a user wearing one or both of head-wearable audio devices 102 may perform a motion gesture by moving their head in one or more directions or by a distance, or rotating their head in one or more directions (e.g., roll, pitch, yaw) and/or to over a certain angle. In some embodiments, a motion gesture may be detected relative to one or more thresholds. In another example, a user may perform a motion gesture by touching, tapping, swiping, or pinching an area of one or both of the head-wearable audio device(s) 102 (e.g., on an area of a housing of a head-wearable audio device). Motion sensor 112 may be configured to detect or measure the motion gesture in the head-wearable audio device. Motion sensor 112 may also be configured to output one or more motion parameter values that define characteristics of the detected (e.g., measured) motion event (e.g., motion parameters indicating distance, velocity, direction, duration, acceleration, force, rotational angle, angular direction (e.g., roll, pitch, yaw), etc.). The motion parameter values may be may be stored in memory device 208 as motion parameter values 228. Also, the motion parameter values may be utilized for gesture recognition in motion gesture-type recognizer 214 or in capacitive touch plus motion gesture-type recognizer 216. Furthermore, the motion parameter values may also be used in gesture-recognition-parameter-value refinement process 226. In some embodiments motion parameter values determined in a first one of head-wearable audio devices 102 may be transmitted via wireless and/or wired transceiver 118 to a second one of head-wearable audio devices 102 for storage, gesture recognition processes, and/or gesture-recognition-parameter-value refinement process 226. Moreover, audio device controller 106 may be configured to transmit the motion parameter values to computing device 104 to be stored in sensor data and statistics 338. In some embodiments, audio device controller 106 of one or both of head-wearable audio devices 102 may be configured to transmit detected motion parameters to computing device 104 for use in performing gesture recognition and/or for use in gesture-recognition-parameter-value refinement process 340. With the ability to transmit data such as parameter values from one head-wearable audio device 102 to a second head-wearable audio device 102, or to computing device 104, processing power and storage capacity may be reduced in the head-wearable audio device(s). In this regard, gesture recognition, parameter-value refinement processes, and/or parameter storage may be offloaded to the second device. For example, recognition and/or refinement processes may be performed in just one of head-wearable audio devices 102 or in computing device 104. By concentrating these features in one of the head-wearable audio devices, system implementation and setup may be simplified and thus more efficient.

In step 404, a gesture type is selected from among a plurality of gesture types based at least on a comparison of the one or more motion parameter values with one or more per-user per-gesture-type recognition parameter values. For example, a gesture-type recognizer such as motion gesture-type recognizer 214 or capacitive touch plus motion gesture-type recognizer 216 may be configured to select a gesture type from among a plurality of gesture types 240 by comparing the one or more motion parameter values output from motion sensor 112 with one or more sets of parameter values of per-user per-gesture-type recognition parameter values 222, where each set is associated with a gesture type. The per-user per-gesture-type recognition parameter values for a particular gesture type may comprise parameter values that have been generated or improved over time based on historical set(s) of detected motion parameter values and corresponding selected gesture-types for each given gesture type. In one example, motion gesture-type recognizer 214 may be configured to compare motion parameter values output from motion sensor 112 (e.g., indicating a forward head tilt (in pitch) by 45°) to a plurality of per user per-gesture-type recognition parameter values 222, and may determine that the output motion parameter values match a set of per-user per-gesture-type recognition parameter values that define a type of gesture comprising a forward tilt (in pitch) of head-wearable audio device 102A greater than 30°, and thus, select this gesture type. Motion gesture-type recognizer 214 may also be configured to select a particular gesture type from gesture types 240 based on a comparison of the one or more motion parameter values with one or more default parameter values of default gesture-type recognition parameters values 218.

By utilizing improved thresholds or other improved defining spatial or temporal characteristics that are adapted for a particular gesture type and/or for a particular user (e.g., per-user per-gesture-type recognition parameter values), the recognition process is more accurate (confidence levels are improved) when selecting gestures, and selection may be performed more quickly as compared to using static or default recognition parameters. This is because use of the improved gesture recognition parameter values that are adapted over time for a particular gesture and/or for a particular user reduces erroneous gesture and/or action selections and reduces or mitigates the need for a user to repeat gesture inputs and for repeated gesture recognition process cycles.

In step 406, an action is selected from among a plurality actions based at least on the selected gesture type. As described above, each type of gesture of gesture types 240 may be associated with one or more actions of actions 242, and vice versa. Action determiner 232 may be configured to select an action from among a plurality of actions of actions 242 based on an association between the selected gesture type and the selected action in memory device 208. Actions 242 may comprise actions that can be executed within one or both of head-wearable audio device(s) 102. Moreover, actions of actions 242 may comprise actions that may be executed within or relative to computing device 104 (e.g., actions caused by operating system 330 or by an application of application(s) 332). In an example, the selected gesture type may comprise a forward tilt (in pitch) of the head-wearable audio device 102A greater than 30° and the associated action of actions 242 may comprise lowering the volume of sound output from speakers 114 in both of head-wearable audio devices 102. In another example, the selected gesture may comprise a forward tilt (in pitch) of the head-wearable audio device 102A greater than 30° and the associated action of actions 242 may comprise moving forward in a playlist of a media player application of applications 332 of computing device 104.

In step 408, the head-wearable audio device or a device that is communicatively coupled to the head-wearable audio device causes the selected action to be executed. For example, action controller 236 may be configured to cause the selected action of actions 242 to be executed within one or both of head-wearable audio device(s) 102 and/or within or relative to computing device 104. In one example, action controller 236 may be configured to cause audio device controller 106 to send a signal or a command to raise volume in speaker(s) 114 of one or both of head-wearable audio device(s) 102. In another example, action controller 236 may send a signal or command to a media application of applications 332 to access and play a next piece of media content (e.g., a song) in a playlist. More generally, action controller 236 may be configured to communicate an action command to any remote computing device communicatively coupled to its head-wearable audio device 106 for implementing the selected action in an application instantiated in the remote computing device.

In some embodiments, motion gesture-type recognizer 214 or capacitive touch plus motion gesture-type recognizer 216 may be configured to select the gesture type from among a plurality of gesture types of gesture types 240 stored in a first one of head-wearable audio devices 102 based on one or more motion parameter values received from a second one of the head-wearable audio device 102.

In some embodiments, action determiner 232 of a first one of head-wearable audio devices 102 may be configured to select an action based on one or more selected gesture types received from a second one of the head-wearable audio device 102 or based on a selected action received from the second one of the head-wearable audio device 102.

Furthermore, as described above, although the functions comprising selection of a gesture type, selection of an action, and causing the action to be executed are described herein as being performed by program code of one or both of head-wearable audio device(s) 102, all or a portion of the functions may be performed by program code of computing device 104, and results of the functions may be communicated to one or both of head-wearable audio devices 102. For example, detected motion parameters (and/or detected capacitive touch parameters) may be sent to computing device 104. Gesture recognizer 334 may return a selected gesture to one or both of head-wearable audio devices that may select an associated action. Alternatively, gesture recognizer 334 may return a selected action to one or both of head-wearable audio devices 102 that may execute the selected action or electronic processor 120 may execute the action locally in computing device 104.

Figure 5:
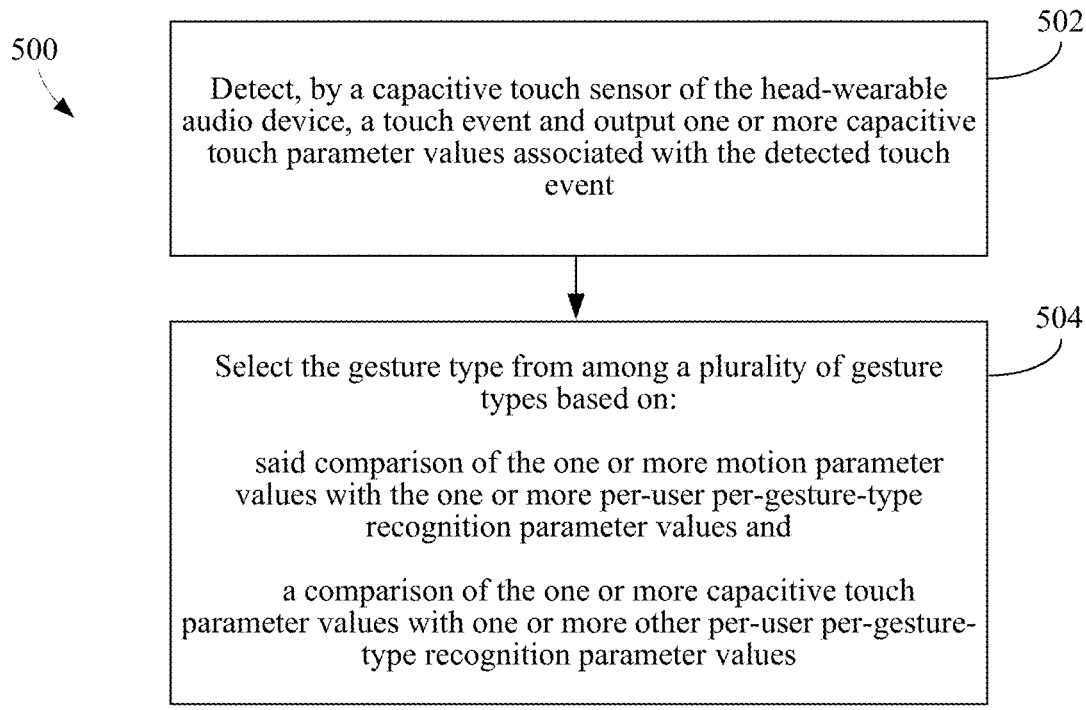
FIG. 5 is a flowchart of a method for selecting a gesture type based on motion and capacitive touch input, according to an example embodiment.

As described above, one or both of head-wearable audio devices 102A and 102B may comprise a capacitive touch sensor 110 that is configured to detect capacitive touch input. For instance, FIG. 5 is a flowchart 500 of a method for selecting a gesture type based on motion and capacitive touch input, according to an example embodiment. Flowchart 500 may be implemented in systems 100, 200, and 300. For purposes of illustration, flowchart 500 is described with reference to FIGS. 1, 2, and 3. Other structural and operational embodiments will be apparent to persons skilled in the relevant art(s) based on the following discussion regarding flowchart 500.

Flowchart 500 begins with step 502. In step 502, a capacitive touch sensor of the head-wearable audio device detects a touch event and outputs one or more capacitive touch parameter values associated with the detected touch event. For example, a user may make contact with a capacitive touch sensor 110 surface on one or both of head-wearable audio devices 102 to input a capacitive touch gesture using an electrically conductive object, such as a fingertip. Some example capacitive touch gestures comprise a tap, a double tap (e.g., taps within a specified time delay), swipe up, swipe down, swipe left swipe right, pinch in, pinch out, etc. One or both of capacitive touch sensors 110 may be configured to detect the capacitive touch event and output one or more capacitive touch parameter values that represent characteristics of the capacitive touch event. For example, the capacitive touch parameters may indicate that the user double tapped capacitive touch sensor 110 of head-wearable audio device 106A with a delay of one half second between taps. In some embodiments the capacitive touch sensor surface may comprise an array of capacitive touch sensors that may be configured to detect length and/or direction of a swipe, or a pinch. For example, the capacitive touch parameters may indicate that the user swiped in a downward direction on the capacitive touch surface. Audio device controller 106 may be configured to store the detected capacitive touch parameter values in capacitive touch parameter values 230 and/or may be configured to transmit the detected capacitive touch parameter values and/or detected motion parameter values to computing device 104 for (1) storage in sensor data and statistics 338, (2) use in performing gesture recognition, and/or (3) use in gesture-recognition-parameter-value refinement process 340.

In step 504, a gesture type from among a plurality of gesture types may be selected based on said comparison of the one or more motion parameter values with the one or more per-user per-gesture-type recognition parameter values and a comparison of the one or more capacitive touch parameter values with one or more other per-user per-gesture-type recognition parameter values. For example, motion sensor 112 of head-wearable audio devices 102A may also detect the user's touch contact that was made with capacitive touch sensor 110 surface based on motion of head-wearable audio device 102A that was caused by the contact. Motion sensor 112 may output one or more motion parameter values corresponding to the user's contact. Capacitive touch plus motion gesture-type recognizer 216 may be configured to select a gesture type from among a plurality of gesture types 240 by comparing the one or more motion parameter values output from motion sensor 112 with one or more parameter values of per-user per-gesture-type recognition parameter values 222 (and/or default gesture-type recognition parameter values 218) and by comparing the one or more capacitive touch parameters values output from motion sensor 112 with one or more per-user per-gesture-type recognition parameter values 222 (and/or default gesture-type recognition parameter values 218). Capacitive touch plus motion gesture-type recognizer 216 may further be configured to compare the gesture selections that were made based on the motion parameter values with the gesture selections made based on the capacitive touch parameter values to determine a preferred gesture type selection. For example, the gesture selection based on capacitive touch parameter values may comprise (1) a swipe down having a low probability (e.g., 0.42) and (2) a double tap also having a low probability (e.g., 0.36), whereas the gesture selection based on the motion parameter values may comprise (1) a swipe down having a low probability (e.g., 0.21) and (2) a double tap having a higher probability (e.g., 0.68). In this example, capacitive touch plus motion gesture-type recognizer 216 may output the double tap as the preferred or selected gesture type. The probabilities may be determined based on how close the capacitive touch parameter values and/or motion parameter values correspond to thresholds or ranges in the per-user per-gesture-type recognition parameter values 222 (and/or in the default gesture-type recognition parameter values 218).

By utilizing motion sensor or motion sensor plus capacitive touch sensor output for recognizing a user's input gestures, additional gesture types may be detected by the head-wearable audio device(s). For example, various types of touch gestures (e.g., taps, swipes, pinches) utilizing non-conductive objects (e.g., a touch from a gloved hand, a shoulder tap, or a pencil swipe) may be detected by motion sensor(s) 112. Moreover, gesture selection for touch gesture input may be improved because output from both of the capacitive touch sensor and the motion sensor may contribute to a gesture recognition process.

Figure 6:
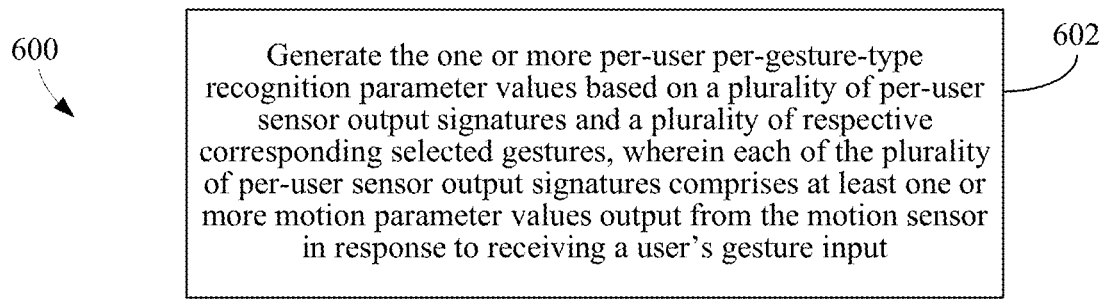
FIG. 6 is a flowchart a method for determining per-user per-gesture-type recognition parameters based on per-user sensor output signatures, according to an example embodiment.

As described above, per-user per-gesture-type recognition parameters may be utilized in recognizing a user's input gesture. FIG. 6 is a flowchart 600 of a method for determining per-user per-gesture-type recognition parameters based on per-user sensor output signatures, according to an example embodiment. Flowchart 600 may be implemented in systems 100, 200, and 300. For purposes of illustration, flowchart 600 is described with reference to FIGS. 1, 2, and 3. Other structural and operational embodiments will be apparent to persons skilled in the relevant art(s) based on the following discussion regarding flowchart 600.

Flowchart 600 includes step 602. In step 602, the one or more per-user per-gesture-type recognition parameter values may be generated based on a plurality of per-user sensor output signatures and a plurality of respective corresponding selected gestures, wherein each of the plurality of per-user sensor output signatures comprises at least one or more motion parameter values output from the motion sensor in response to receiving a user's gesture input. For example, each gesture type of gesture types 240 may be associated with one or more user sensor output signatures for a particular user or for multiple users. As described above, when a user performs a motion gesture, motion sensor 112 outputs one or more motion parameter values corresponding to the performed motion gesture, and motion gesture-type recognizer 214 (or capacitive touch plus motion gesture-type recognizer 216) may select a gesture type based on (e.g., matching) the one or more motion parameter values. The set of one or more motion parameter values used to select the motion gesture type may be referred to as a per-user motion sensor output signature for that gesture type, and the signature may be stored with per-user sensor output signatures 224, and may be associated with the corresponding selected motion gesture type in memory device 208. In other words, there may be multiple pairs, where each pair comprises a per-user motion sensor output signature and a corresponding selected motion gesture type stored in memory 208.

In general, by updating gesture-type recognition parameter values that are utilized to recognize a gesture input, the gesture recognition process may become more accurate and may be performed more quickly because parameter values such as thresholds that are used for recognizing gesture inputs are adapted over time for each type of gesture and/or for a particular user of the head-wearable audio device(s), and erroneous or low confidence gesture and action selections may be avoided.

As described above, each of the user's sensor output signatures for a particular type of gesture may have various characteristics or ranges in its sensor measurements (e.g., for velocity, force, distance traversed, direction, spatial orientation, rotational angle, duration, etc.). For example, a motion sensor output signature for a tap gesture performed by a user may comprise a short and significant spike in acceleration of the device in one direction and a bounce backwards, but the average level and/or direction of acceleration may be different for different users. Also, measurements for the same user may vary somewhat over multiple inputs of the same gesture by the user. The association of a sensor output signature and a gesture-type that is selected based on the signature may be referred to as a sensor output signature/gesture-type pair. Over time, data including sensor output signature/gesture-type pairs may be stored, and statistics may be generated based on the sensor output signatures (e.g., motion or capacitive touch parameter value averages, deviations, outliers, etc.) for each type of gesture. The stored data and statistics may be utilized to generate or refine (e.g., update) per-user per-gesture-type recognition parameter values. In some embodiments, the sensor output signature/gesture-type pair data and/or statistics may be stored in one or both of head-wearable audio devices 102 as per-user sensor output signatures 224. Alternatively or in addition, the sensor output signature/gesture-type pair data and/or statistics may be stored in computing device 104 with sensor data and statistics 338. In some embodiments, the sensor output signature/gesture-type pairs may be associated in memory with a user of head-wearable audio device(s) 102 and/or of computing device 104, for example, according to user preferences and profile data, or login information. In some embodiments, it may be assumed that there is only one user of the head-wearable audio device. In a similar manner as described for motion sensor output signature/gesture-type pairs, capacitive touch sensor output signature/gesture-type pairs may be generated and stored based on capacitive touch parameter values and corresponding selected gesture types for gestures input to capacitive touch sensor 110.

Gesture-recognition-parameter-value refinement process 226 (and/or gesture-recognition-parameter-value refinement process 340) may be configured to generate or refine (e.g., update) per-user per-gesture-type recognition parameters based on one or more of the following: (1) information stored in user preferences and profile data 220, (2) machine learning models that are trained based on a plurality of historical sensor output signature/gesture-type pairs (e.g., utilizing motion parameter values 228 and/or capacitive touch parameter values 230), and (3) automated rule based logic directed to historical sensor output signature/gesture-type pairs (e.g., utilizing motion parameter values 228 and/or capacitive touch parameter values 230).

For each gesture type of gesture types 240 (and/or for each user), gesture-recognition-parameter-value refinement process 226 may be configured to generate one or more per-user per-gesture-type recognition parameter values based on a plurality of the user's sensor output signatures that are associated with the respective gesture type (in other words, based on sensor output signature/gesture-type pairs). For example, a per-user per-gesture-type recognition parameter value for a motion gesture configured as a forward head tilt may be determined, adjusted, or improved over time based on averaged motion parameter values for gestures selected as the forward head tilt. In some embodiments, a set of default gesture-type recognition parameter values may be configured for each movement gesture and/or each capacitive touch gesture. For example, default gesture-type recognition parameter values for the forward head tilt may have thresholds for direction and angle such as a downward change in pitch greater that 30° (e.g., stored with default gesture-type recognition parameter values 218 in one or both of head-wearable audio device(s) 102, or with sensor data and statistics 338 in computing device 104). Based on collected data and/or statistics for sensor output signatures associated with the forward head tilt, gesture-recognition-parameter-value refinement process 226 (or gesture-recognition-parameter-value refinement process 340) may be configured to adjust or refine the default gesture-type recognition parameter values for the forward head tilt type of gesture to generate per-user per-gesture-type recognition parameter values for the forward head tilt. The adjusted per-user per-gesture-type recognition parameter values may be stored in memory device 208 or memory device 122 (e.g., as a downward change in pitch greater that 23°).

Per-user per-gesture-type recognition parameter values 222 may be determined for each type of gesture based on motion sensor 112 output parameter values alone (e.g., when touch is not detected by capacitive touch sensor 110 for a gesture input), capacitive touch sensor 110 output parameter values alone, or a combination of motion parameter values and capacitive touch parameter values. Utilizing the combination of motion and capacitive touch parameter values may increase a confidence level of gesture recognition. In some embodiments, the per-user per-gesture-type recognition parameter values may be associated in memory with a particular user.

Moreover, audio device controller 106 of one or both head-wearable audio device(s) 102 may be configured to transmit, via remote application interface 238, a plurality of per-user sensor output signatures and a plurality of respective corresponding selected gestures to remote computing device 104. Gesture-recognition-parameter-value refinement process 340 in computing device 104 may be configured to generate or update the one or more per-user per-gesture-type recognition parameter values based on the transmitted plurality of per-user sensor output signatures and the plurality of respective corresponding selected gestures. This allows for reducing or reassigning processing resources in the head-wearable audio devices 102. Also, greater processing resources and/or storage capacity that may be available in computing device 104, may provide for improved accuracy in per-user per-gesture-type recognition parameter value refinement processes, including machine learning processes.

Figure 7:
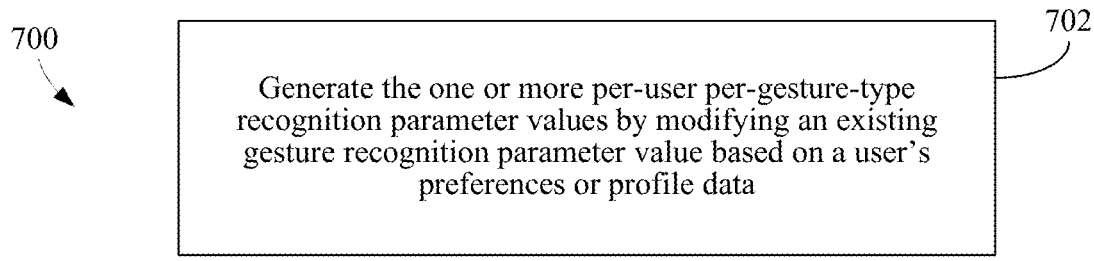
FIG. 7 is a flowchart of a method for determining per-user per-gesture-type recognition parameter values based on a user's preferences or profile data, according to an example embodiment.

As described above, per-user per-gesture-type recognition parameter values may be generated or updated based on sensor output signatures for each gesture. FIG. 7 is a flowchart 700 of a method for determining per-user per-gesture-type recognition parameter values based on a user's preferences or profile data, according to an example embodiment. Flowchart 700 may be implemented in systems 100, 200, and 300. For purposes of illustration, flowchart 700 is described with reference to FIGS. 1, 2, and 3. Other structural and operational embodiments will be apparent to persons skilled in the relevant art(s) based on the following discussion regarding flowchart 700.

Flowchart 700 includes step 702. In step 702, one or more per-user per-gesture-type recognition parameter values may be generated by modifying an existing gesture recognition parameter value based on a user's preferences or profile data. For example, as described above, user preferences and profile data 220 may comprise information configured by a user or information about the user collected by one or both of head-wearable audio device(s) 102 audio device controller(s) 106 or an application in computing device 104. For example, user preferences and profile data 220 may include preferences for gesture characteristics such as motion parameter values motion and/or capacitive touch parameter values for various gestures. Some examples include a maximum delay threshold for time between taps of a double tap gesture, a minimum angle threshold for a head tilt, a location range for a downward swipe, etc. Moreover, user preferences and profile data 220 may include information about a user that may indicate appropriate motion and/or capacitive touch parameter value. For example, a user's age may be stored in user preferences and profile data 220 (or 336). Gesture-recognition-parameter-value refinement process 226 (or 340) may be configured to generate or update one or more per-user per-gesture-type recognition parameter values by modifying an existing gesture recognition parameter (e.g., a default gesture-type recognition parameter value or an existing per-user per-gesture-type recognition parameter value) based on the user's age. For example, if a user's age is below 20 years, a first value for minimum velocity of a swipe may be utilized and if a user's age is greater than or equal to 20 years a second value for minimum velocity of a swipe may be utilized. In some embodiments, the per-user per-gesture-type recognition parameter values are generated based on a type of application instantiated in computing device 104 that is utilized by the user. Utilizing information that is easily available in a user's preferences or profile data 220 provides for a quick and efficient path to customizing gesture recognition parameter values more accurately for a specific user.

Figure 8:
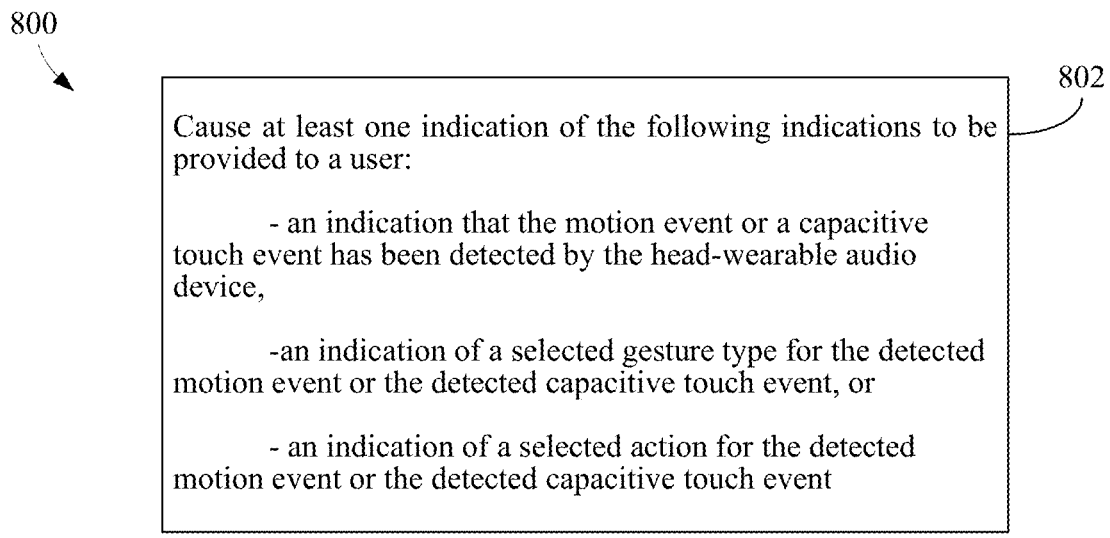
FIG. 8 is a flowchart of a method for generating a gesture confirmation output in response to an input gesture, according to an example embodiment.

Sometimes, a user may not be sure if a gesture that was input to a motion or capacitive touch sensor has been detected, or which type of gesture was detected. Moreover, an action taken based on an input gesture may not be noticeable to the user. In some embodiments, head-wearable audio device(s) 102 may provide gesture confirmation to a user. For instance, FIG. 8 is a flowchart 800 of a method for generating a gesture confirmation in response to an input gesture, according to an example embodiment. Flowchart 800 may be implemented in systems 100, 200, and 300. For purposes of illustration, flowchart 800 is described with reference to FIGS. 1, 2, and 3. Other structural and operational embodiments will be apparent to persons skilled in the relevant art(s) based on the following discussion regarding flowchart 800.

Flowchart 800 includes step 802. In step 802, at least one indication of the following indications is provided to a user: an indication that a motion event or a capacitive touch event has been detected by the head-wearable audio device, an indication of a selected gesture type for the detected motion event or the detected capacitive touch event, or an indication of a selected action for the detected motion event or the detected capacitive touch event. For example, gesture confirmation generator 234 may be configured to cause a gesture confirmation indication to be provided to a user in response to detecting a motion event (e.g., a gesture input imparting motion to motion sensor 112 of head-wearable audio device 102) or a capacitive touch event (e.g., a gesture input imparting electrical conduction to capacitive touch sensor 110 of head-wearable audio device 102). The gesture confirmation may comprise an indication that the motion event (e.g., motion gesture input) or the capacitive touch event (e.g., capacitive touch gesture input) has been detected by a sensor in the head-wearable audio device. In some embodiments, the gesture confirmation may comprise an indication of a selected gesture type for the detected motion event or the detected capacitive touch event. Moreover, the gesture confirmation may comprise an indication of a selected action for the detected motion event or the detected capacitive touch event. The gesture confirmation indicators may take various communicative forms. For example, the gesture confirmation indicator may comprise audio feedback delivered via speaker(s) 114 of one or both of head-wearable audio device(s) 102 (e.g., a tone or other sound(s)), a visual effect delivered via a user interface of an application of applications 332 in display screen 342 (e.g., a graphical representation as a gesture confirmation indicator). Moreover, gesture confirmation generator 234 may be configured to transmit a command to haptic feedback actuator 116 for generating a gesture confirmation indication. For example, haptic feedback actuator 116 may generate a tactile stimulus gesture confirmation to the user (i.e., haptic feedback), such as a vibration, via one or both of head-wearable audio device(s) 102. In some embodiments, the haptic feedback may have a specified intensity, pattern, and/or frequency that may indicate a type confirmation information. For example, a low frequency vibration may indicate confirmation that a gesture was detected, two short bursts of vibration may confirm that a head tilt forward type gesture was detected, or a high frequency vibration may indicate that the gesture was not understood and should be repeated.

Figure 9:
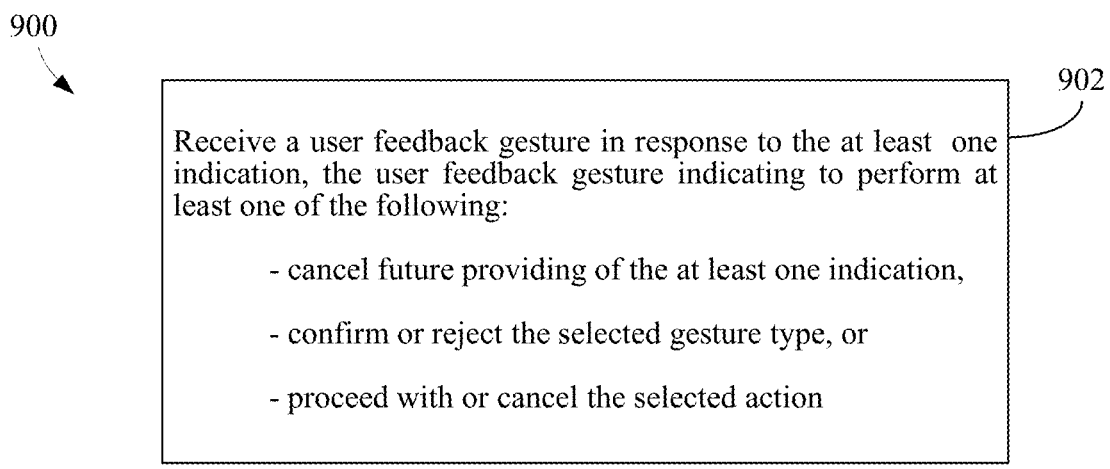
FIG. 9 is a flowchart of a method for receiving feedback from a user in response to a gesture confirmation output that was delivered to the user, according to an example embodiment.

A user may wish to input feedback relative to the gesture confirmation to head-wearable audio device(s) 102 in order to modify or control behavior of the head-wearable audio device(s). For instance, FIG. 9 is a flowchart 900 of a method for receiving feedback from a user in response to a gesture confirmation output that was delivered to the user, according to an example embodiment. Flowchart 900 may be implemented in systems 100, 200, and 300. For purposes of illustration, flowchart 900 is described with reference to FIGS. 1, 2, and 3. Other structural and operational embodiments will be apparent to persons skilled in the relevant art(s) based on the following discussion regarding flowchart 900.

Flowchart 900 includes step 902. In step 902, a user feedback gesture may be received in response to the at least one indication. The user feedback gesture may indicate at least one of the following actions: cancel further providing of the at least one indication initiated by the gesture confirmation generator, confirm or reject the selected gesture type, or proceed with or cancel the selected action. For example, a user feedback gesture may be received via motion sensor 112 and/or capacitive touch sensor 110 in response to a gesture confirmation delivered to the user as described above. A gesture recognizer (e.g., capacitive touch gesture-type recognizer 212, motion gesture-type recognizer 214, and/or capacitive touch plus motion gesture-type recognizer 216) may be configured to select a corresponding user feedback gesture type from gesture types 240 based on motion parameter values and/or capacitive touch parameter values output by the motion and/or capacitive touch sensor(s) for the input user feedback gesture. Action determiner 232 may be configured to select an action from actions 242 to be executed in response to the selected user feedback gesture type and transmit a command to appropriate program code to initiate the selected action. The selected action for the selected gesture may comprise, for example, cancelling future gesture confirmations for the selected gesture type or other types of gestures, confirming or rejecting the selected gesture type, or proceeding with or cancelling the selected action.

By enabling user feedback to gesture confirmation delivered to the user, per-user per-gesture-type recognition parameter values (e.g., comprising spatial and/or temporal characteristics or thresholds associated with particular gestures) may be improved over time. For example, if a user indicates in the user feedback that the selected gesture was incorrect, gesture-recognition-parameter-value refinement process 226 may be configured to modify the recognition parameter values based on the negative feedback (e.g., threshold values in the recognition parameter values may be made more tolerant).

III. Example Computer System Implementation

Embodiments described herein may be implemented in hardware, or hardware combined with software and/or firmware. For example, embodiments described herein including but not limited to, system 100, system 200, and system 300 may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to system 100, system 200, and system 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
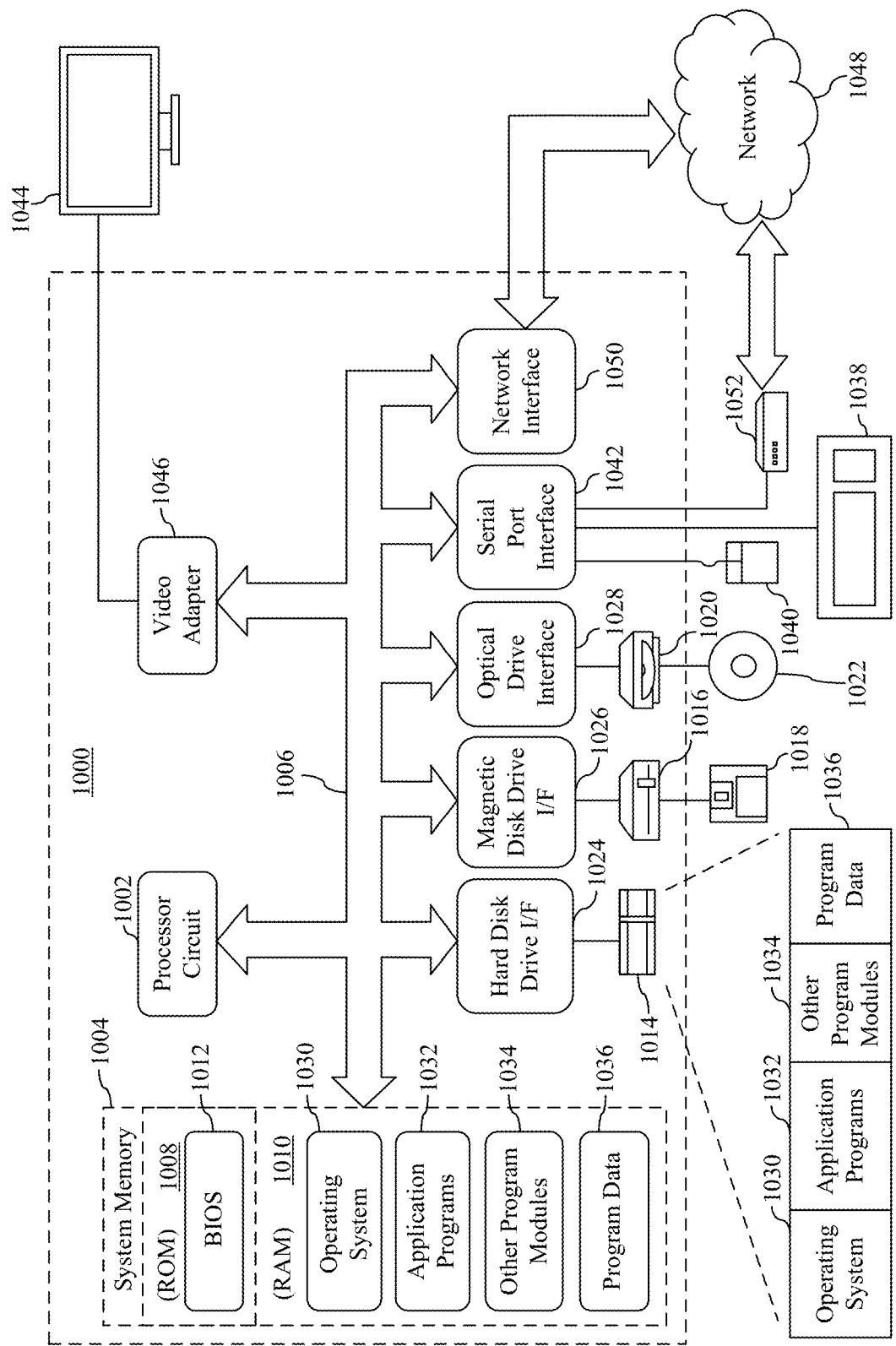
FIG. 10 an example processor-based computer system that may be used to implement various example embodiments.

FIG. 10 is a block diagram of an example processor-based computer system 1000 that may be used to implement various embodiments. The computing devices of system 100, system 200, and system 300, may each include any suitable type of computing device, mobile or stationary, such as a desktop computer, a server, a video game console, etc. For example, any of the computing devices of system 100, system 200, and system 300 may be any suitable type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google®

Android™ operating system, etc.), a wearable computing device (e.g., a head-mounted device including smart glasses such as Google® Glass™, Oculus Rift® by Oculus VR, LLC, a head-wearable audio device, etc.), a stationary computing device such as a desktop computer or PC (personal computer), a gaming console/system (e.g., Microsoft Xbox®, Sony PlayStation®, Nintendo Wii® or Switch®, etc.), etc.

The computing devices of system 100, system 200, and system 300 may each be implemented in one or more computing devices containing features similar to those of computing device 1000 in stationary or mobile computer embodiments and/or alternative features. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing audio device controller 106, microphone 108, capacitive touch sensor 110, motion sensor 112, speaker 114, haptic feedback actuator 116, wireless and/or wired transceiver 118, electronic processor 120, memory device 122, wireless and/or wired transceiver 124, capacitive touch gesture-type recognizer 212, motion gesture-type recognizer 214, capacitive touch plus motion gesture-type recognizer 216, gesture-recognition-parameter-value refinement process 226, action determiner 232, gesture confirmation generator 234, action controller 236, remote application interface 238, display screen, speaker, and/or microphone devices 342, operating system 330, applications 332, gesture recognizer 334, gesture-recognition-parameter-value refinement process 340, flowchart 400, flowchart 500, flowchart 600, flowchart 700, flowchart 800, flowchart 900, and/or further embodiments described herein. Program data 1036 may include default gesture-type recognition parameter values 218, user preferences and profile data 220, per-user per-gesture-type recognition parameter values 222, per-user sensor output signatures 224 gesture types 240, motion parameter values 228, capacitive touch parameter values 230, actions 242, user preferences and profile data 336, sensor data and statistics 338, and/or further embodiments described herein.

A user may enter commands and information into computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a head-wearable audio device comprises a motion sensor configured to detect a motion event and output one or more motion parameter values associated with the detected motion event. The head-wearable audio device also includes a processor and a memory device that stores program code to be executed by the processor. The program code comprises a gesture-type recognizer that is configured to select a gesture type from among a plurality of gesture types based at least on a comparison of the one or more motion parameter values with one or more per-user per-gesture-type recognition parameter values. The program code also comprises an action determiner that is configured to select an action from among a plurality actions based at least on the selected gesture type, and an action controller configured to cause the selected action to be executed by at least one of the head-wearable audio device or a device that is communicatively coupled to the head-wearable audio device.

In an embodiment of the foregoing head-wearable audio device, the gesture-type recognizer is configured to select the gesture type from among the plurality of gesture types based also on one or more motion parameter values received from another head-wearable audio device.

In an embodiment of the foregoing head-wearable audio device, the action determiner is configured to select the action based also on one or more selected gesture types received from another head-wearable audio device or a selected action received from the other head-wearable audio device.

In an embodiment of the foregoing head-wearable audio device, the head-wearable audio device further comprises a capacitive touch sensor that is configured to detect a capacitive touch event and output one or more capacitive touch parameter values associated with the detected capacitive touch event. The gesture-type recognizer is further configured to select the gesture type from among a plurality of gesture types based on said comparison of the one or more motion parameter values with the one or more per-user per-gesture-type recognition parameter values and a comparison of the one or more capacitive touch parameter values with one or more other per-user per-gesture-type recognition parameter values.

In an embodiment of the foregoing head-wearable audio device, the program code further comprises a gesture-recognition-parameter-value refinement process that is configured to generate the one or more per-user per-gesture-type recognition parameter values based on a plurality of per-user sensor output signatures and a plurality of respective corresponding selected gestures. Each of the plurality of per-user sensor output signatures comprises at least one or more motion parameter values output from the motion sensor in response to receiving a user's gesture input.

In an embodiment of the foregoing head-wearable audio device, the program code further comprises a gesture-recognition-parameter-value refinement process that is configured to generate the one or more per-user per-gesture-type recognition parameter values by modifying an existing gesture recognition parameter value based on a user's preferences or profile data.

In an embodiment of the foregoing head-wearable audio device, the program code further comprises a gesture confirmation generator that is configured to cause at least one indication of the following indications to be provided to a user in response to detecting the motion event or a capacitive touch event: an indication that the motion event or the capacitive touch event has been detected by the head-wearable audio device, an indication of a selected gesture type for the detected motion event or the detected capacitive touch event, or an indication of a selected action for the detected motion event or the detected capacitive touch event.

In an embodiment of the foregoing head-wearable audio device, the head-wearable audio device further comprises a haptic feedback actuator where the gesture confirmation generator is configured to control the haptic feedback actuator to provide the at least one indication.

In an embodiment of the foregoing head-wearable audio device, the action determiner is further configured to receive a user feedback gesture in response to the at least one indication. The user feedback gesture indicates to perform at least one of the following: cancel future providing of indications initiated by the gesture confirmation generator, confirm or reject the selected gesture type, or proceed with or cancel the selected action.

In an embodiment of the foregoing head-wearable audio device, the program code further comprises a remote application interface that is configured to transmit a plurality of per-user sensor output signatures and a plurality of respective corresponding selected gestures to a remote computing device that is communicatively coupled to the head-wearable audio device. The remote computing devices is configured to generate the one or more per-user per-gesture-type recognition parameter values based on the transmitted plurality of per-user sensor output signatures and a plurality of respective corresponding selected gestures.

In an embodiment of the foregoing head-wearable audio device, the program code further comprises a remote application interface that is configured to communicate an action command to a remote computing device that is communicatively coupled to the head-wearable audio device for implementing the selected action in an application instantiated in the remote computing device.

In an embodiment of the foregoing head-wearable audio device, settings are configurable by a user for: selecting which gesture types to enable or disable, adjusting characteristics of each gesture type for gesture recognition of motion, touch, or sound user gesture input, mapping a gesture type to an action, selecting which types of gesture confirmation to enable or disable, or mapping a gesture confirmation indicator type to a gesture type.

In an embodiment, a method that is performed by a head-wearable audio device comprises detecting, by a motion sensor of the head-wearable audio device, a motion event and outputting one or more motion parameter values associated with the detected motion event. The method further comprises selecting a gesture type from among a plurality of gesture types based at least on a comparison of the one or more motion parameter values with one or more per-user per-gesture-type recognition parameter values, selecting an action from among a plurality actions based at least on the selected gesture type, and causing the selected action to be executed by at least one of the head-wearable audio device or a device that is communicatively coupled to the head-wearable audio device.

In an embodiment of the foregoing method, the method further comprises detecting, by a capacitive touch sensor of the head-wearable audio device, a capacitive touch event and outputting one or more capacitive touch parameter values associated with the detected capacitive touch event. The method further comprises selecting the gesture type from among a plurality of gesture types based on: said comparison of the one or more motion parameter values with the one or more per-user per-gesture-type recognition parameter values and a comparison of the one or more capacitive touch parameter values with one or more other per-user per-gesture-type recognition parameter values.

In an embodiment of the foregoing method, the method further comprises generating the one or more per-user per-gesture-type recognition parameter values based on a plurality of per-user sensor output signatures and a plurality of respective corresponding selected gestures. Each of the plurality of per-user sensor output signatures comprises at least one or more motion parameter values output from the motion sensor in response to receiving a user's gesture input.

In an embodiment of the foregoing method, the method further comprises generating the one or more per-user per-gesture-type recognition parameter values by modifying an existing gesture recognition parameter value based on a user's preferences or profile data.

In an embodiment of the foregoing method, the method further comprises causing at least one indication of the following indications to be provided to a user: an indication that the motion event or a capacitive touch event has been detected by the head-wearable audio device, an indication of a selected gesture type for the detected motion event or the detected capacitive touch event, or an indication of a selected action for the detected motion event or the detected capacitive touch event.

In an embodiment of the foregoing method, the method further comprises receiving a user feedback gesture in response to the at least one indication where the user feedback gesture indicates to perform at least one of the following: cancel future providing of the at least one indication, confirm or reject the selected gesture type, or proceed with or cancel the selected action.

In an embodiment, a computer-readable storage medium that has program code recorded thereon that when executed by at least one processor causes the at least one processor to perform a method. The method comprises receiving, from a motion sensor, one or more motion parameter values associated with a detected motion event, selecting a gesture type from among a plurality of gesture types based at least on a comparison of the one or more motion parameter values with one or more per-user per-gesture-type recognition parameter values, selecting an action from among a plurality actions based at least on the selected gesture type, and causing the selected action to be executed by at least one of the head-wearable audio device or a device that is communicatively coupled to the head-wearable audio device.

In an embodiment of the foregoing computer-readable storage medium, the method further comprises receiving, from one or more capacitive touch sensors, one or more capacitive touch parameter values associated with a detected capacitive touch event. The gesture-type recognizer is further configured to select the gesture type from among a plurality of gesture types based on said comparison of the one or more motion parameter values with the one or more per-user per-gesture-type recognition parameter values and a comparison of the one or more capacitive touch parameter values with one or more other per-user per-gesture-type recognition parameter values.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A head-wearable audio device, comprising:
   a motion sensor configured to detect a motion event associated with a first user and output one or more motion parameter values associated with the detected motion event;
   a processor; and
   a memory device, the memory device storing program code to be executed by the processor, the program code comprising:
      a gesture-type recognizer configured to select a gesture type from among a plurality of gesture types based on at least a comparison of the one or more motion parameter values with a first set of per-user per-gesture-type recognition parameter values, the first set of per-user per-gesture type recognition parameter values generated based on a first plurality of sensor output signatures for the first user that is different than a second plurality of sensor output signatures for a second user;
      an action determiner configured to select an action from among a plurality of actions based on at least the selected gesture type; and
      an action controller configured to cause the selected action to be executed by at least one of the head-wearable audio device or a device that is communicatively coupled to the head-wearable audio device.

2. The head-wearable audio device of claim 1, wherein the gesture-type recognizer is configured to select the gesture type from among the plurality of gesture types based also on one or more motion parameter values received from another head-wearable audio device.

3. The head-wearable audio device of claim 1, wherein the action determiner is configured to select the action based also on one or more selected gesture types received from another head-wearable audio device or a selected action received from the other head-wearable audio device.

4. The head-wearable audio device of claim 1, further comprising:
a capacitive touch sensor configured to detect a capacitive touch event and output one or more capacitive touch parameter values associated with the detected capacitive touch event, wherein the gesture-type recognizer is further configured to select the gesture type from among a plurality of gesture types based on:
said comparison of the one or more motion parameter values with the first set of per-user per-gesture-type recognition parameter values and
a comparison of the one or more capacitive touch parameter values with a second set of per-user per-gesture-type recognition parameter values.

5. The head-wearable audio device of claim 1, wherein the program code further comprises a gesture-recognition-parameter-value refinement process configured to:
generate the first set of per-user per-gesture-type recognition parameter values based on the first plurality of sensor output signatures and a plurality of respective corresponding selected gestures, wherein each of the first plurality of per user sensor output signatures comprises at least one or more motion parameter values output from the motion sensor in response to receiving a user's gesture input.

6. The head-wearable audio device of claim 1, wherein the program code further comprises a gesture-recognition-parameter-value refinement process configured to:
generate the first set of per-user per-gesture-type recognition parameter values by modifying an existing gesture recognition parameter value based on a user's preferences or profile data.

7. The head-wearable audio device of claim 1, wherein the program code further comprises a gesture confirmation generator configured to cause at least one indication of the following indications to be provided to a user in response to detecting the motion event or a capacitive touch event:
an indication that the motion event or the capacitive touch event has been detected by the head-wearable audio device,
an indication of a selected gesture type for the detected motion event or the detected capacitive touch event, or
an indication of a selected action for the detected motion event or the detected capacitive touch event.

8. The head-wearable audio device of claim 7, further comprising a haptic feedback actuator wherein the gesture confirmation generator is configured to control the haptic feedback actuator to provide the at least one indication.

9. The head-wearable audio device of claim 7, wherein the action determiner is further configured to receive a user feedback gesture in response to the at least one indication, the user feedback gesture indicating at least one of the following:
cancel future providing of the at least one indication;
confirm or reject the selected gesture type; or
proceed with or cancel the selected action.

10. The head-wearable audio device of claim 1, wherein the program code further comprises a remote application interface configured to:
transmit the first plurality of sensor output signatures and a plurality of respective corresponding selected gestures to a remote computing device communicatively coupled to the head-wearable audio device wherein the remote computing device is configured to generate the first set of per-user per-gesture-type recognition parameter values based on the transmitted first plurality of sensor output signatures and a plurality of respective corresponding selected gestures.

11. The head-wearable audio device of claim 1, wherein the program code further comprises a remote application interface configured to:
communicate an action command to a remote computing device communicatively coupled to the head-wearable audio device for implementing the selected action in an application instantiated in the remote computing device.

12. The head-wearable audio device of claim 1, wherein settings are configurable by a user for:
selecting which gesture types to enable or disable;
adjusting characteristics of each gesture type for gesture recognition of motion, touch, or sound user gesture input;
mapping a gesture type to an action;
selecting which types of gesture confirmation to enable or disable; or
mapping a gesture confirmation indicator type to a gesture type.

13. A method performed by a head-wearable audio device, comprising:
detecting, by a motion sensor of the head-wearable audio device, a motion event associated with a first user and outputting one or more motion parameter values associated with the detected motion event;
selecting a gesture type from among a plurality of gesture types based on at least a comparison of the one or more motion parameter values with a first set of per-user per-gesture-type recognition parameter values, the first set of per-user per-gesture type recognition parameter values generated based on a first plurality of sensor output signatures for the first user that is different than a second plurality of sensor output signatures for a second user;
selecting an action from among a plurality of actions based on at least the selected gesture type; and
causing the selected action to be executed by at least one of the head-wearable audio device or a device that is communicatively coupled to the head-wearable audio device.

14. The method of claim 13, further comprising:
detecting, by a capacitive touch sensor of the head-wearable audio device, a capacitive touch event and outputting one or more capacitive touch parameter values associated with the detected capacitive touch event;
selecting the gesture type from among a plurality of gesture types based on:
said comparison of the one or more motion parameter values with the first set of per-user per-gesture-type recognition parameter values and
a comparison of the one or more capacitive touch parameter values with a second set of per-user per-gesture-type recognition parameter values.

15. The method of claim 13, further comprising:
generating the first set of per-user per-gesture-type recognition parameter values based on the first plurality of sensor output signatures and a plurality of respective corresponding selected gestures, wherein each of the first plurality of sensor output signatures comprises at least one or more motion parameter values output from the motion sensor in response to receiving a user's gesture input.

16. The method of claim 13, further comprising generating the first set of per-user per-gesture-type recognition parameter values by modifying an existing gesture recognition parameter value based on a user's preferences or profile data.

17. The method of claim 13, further comprising causing at least one indication of the following indications to be provided to a user:
- an indication that the motion event or a capacitive touch event has been detected by the head-wearable audio device,
- an indication of a selected gesture type for the detected motion event or the detected capacitive touch event, or
- an indication of a selected action for the detected motion event or the detected capacitive touch event.

18. The method of claim 17, further comprising, receiving a user feedback gesture in response to the at least one indication, the user feedback gesture indicating at least one of the following:
- cancel future providing of the at least one indication;
- confirm or reject the selected gesture type; or
- proceed with or cancel the selected action.

19. A computer-readable storage medium having program code recorded thereon that when executed by at least one processor causes the at least one processor to perform a method, the method comprising:
- receiving, from a motion sensor, one or more motion parameter values associated with a detected motion event, the detected motion event associated with a first user;
- selecting a gesture type from among a plurality of gesture types based on at least a comparison of the one or more motion parameter values with a first set of per-user per-gesture-type recognition parameter values, the first set of per-user per-gesture type recognition parameter values generated based on a first plurality of sensor output signatures for the first user that is different than a second plurality of sensor output signatures for a second user;
- selecting an action from among a plurality of actions based on at least the selected gesture type; and
- causing the selected action to be executed by at least one of the head-wearable audio device or a device that is communicatively coupled to the head-wearable audio device.

20. The computer-readable storage medium of claim 19, further comprising:
- receiving, from one or more capacitive touch sensors, one or more capacitive touch parameter values associated with a detected capacitive touch event, wherein the gesture-type recognizer is further configured to select the gesture type from among a plurality of gesture types based on:
  - said comparison of the one or more motion parameter values with the first set of per-user per-gesture-type recognition parameter values and
  - a comparison of the one or more capacitive touch parameter values with a second set of per-user per-gesture-type recognition parameter values.

* * * * *